(12) United States Patent
Harms et al.

(10) Patent No.: US 12,504,408 B2
(45) Date of Patent: Dec. 23, 2025

(54) APPARATUS COMPRISING A GUARD COLUMN

(71) Applicant: UNIVERSITEIT LEIDEN, EZ Leiden (NL)

(72) Inventors: Amy C. Harms, Leiden (NL); Thomas Hankemeier, Leiden (NL); Tom Van Der Laan, Leiden (NL)

(73) Assignee: UNIVERSITEIT LEIDEN, Leiden (NL)

( * ) Notice: Subject to any disclaimer, the term of this patent is extended or adjusted under 35 U.S.C. 154(b) by 381 days.

(21) Appl. No.: 18/011,051

(22) PCT Filed: Jun. 18, 2021

(86) PCT No.: PCT/EP2021/066673
§ 371 (c)(1),
(2) Date: Dec. 16, 2022

(87) PCT Pub. No.: WO2021/255266
PCT Pub. Date: Dec. 23, 2021

(65) Prior Publication Data
US 2023/0243786 A1    Aug. 3, 2023

(30) Foreign Application Priority Data

Jun. 18, 2020   (GB) ...................... 2009341

(51) Int. Cl.
*G01N 30/46* (2006.01)
*B01D 15/12* (2006.01)
(Continued)

(52) U.S. Cl.
CPC ......... *G01N 30/468* (2013.01); *B01D 15/125* (2013.01); *B01D 15/1871* (2013.01);
(Continued)

(58) Field of Classification Search
None
See application file for complete search history.

(56) References Cited

U.S. PATENT DOCUMENTS

| | | | | |
|---|---|---|---|---|
| 4,883,504 A | * | 11/1989 | Gerstel | G01N 30/32 96/104 |
| 5,641,893 A | * | 6/1997 | Penn | G01N 30/62 73/61.53 |

(Continued)

FOREIGN PATENT DOCUMENTS

| | | |
|---|---|---|
| CN | 106248832 | 12/2016 |
| CN | 106348832 | 12/2016 |

(Continued)

OTHER PUBLICATIONS

Le et al., "Short-Column Liquid Chromatography with Hydride Generation Atomic Fluorescence Detection for the Speciation of Arsenic," Analytic Chemistry. 1998, vol. 70, No. 9, pp. 1926-1933, XPO55773191. Retrieved by https://pubs.acs.org/doi/pdf/10.1021/ac971247q.

(Continued)

*Primary Examiner* — Suman K Nath
(74) *Attorney, Agent, or Firm* — Terry M. Sanks, Esq.; Beusse Sanks, PLLC

(57) ABSTRACT

A chromatography analysis apparatus (30) comprises: a fractionation device (32) for receiving a sample, the fractionation device (32) defining a sample flow path that includes a guard column; and a fractionation output analyser (34), wherein a fractionation output of the guard column is provided to an input of the fractionation output analyser (34) for enabling subsequent analysis of the fractionation output by the fractionation output analyser (34).

18 Claims, 6 Drawing Sheets

(51) Int. Cl.
  *B01D 15/18* (2006.01)
  *B01D 15/32* (2006.01)
  *B01D 15/36* (2006.01)
  *B01D 15/38* (2006.01)
  *G01N 30/08* (2006.01)

(52) U.S. Cl.
  CPC ......... *B01D 15/325* (2013.01); *B01D 15/362* (2013.01); *B01D 15/363* (2013.01); *B01D 15/3847* (2013.01); *G01N 30/08* (2013.01); *G01N 2030/085* (2013.01)

(56) References Cited

U.S. PATENT DOCUMENTS

| | | |
|---|---|---|
| 8,414,774 B2 | 4/2013 | LaMarr et al. |
| 9,897,580 B2 | 2/2018 | Yamaguchi |
| 2006/0157647 A1 | 7/2006 | Siuzdak et al. |

FOREIGN PATENT DOCUMENTS

| | | |
|---|---|---|
| EP | 1310791 | 5/2003 |
| EP | 2217356 | 10/2018 |
| EP | 3486647 | 5/2019 |

OTHER PUBLICATIONS

Hogenboom et al., "Single Short-Column Liquid Chromatography with Atmospheric Pressure Chemical Ionization-(Tandem) Mass Spectrometric Detection for Trace Environmental Analysis," vol. 42, No. 9/10, 1996, pp. 506-514, XP055773186.

Hogenboom et al., "Rapid target analysis of microcontaminants in water by on-line single-short-col. liquid chromatography combined with atmospheric pressure chemical ionization tandem mass spectrometry," Journal of Chromatography A, 777 (1997) 81-90.

Agilent RapidFire 365 High-throughput Mass Spectrometry System Product brochure; Jul. 18, 2013; 5991-2422EN; available on https://sem.com.tr/wp-content/uploads/5991-2422EN_SinglePages.pdf.

C. Krisp et al: "Online Peptide Fractionation Using a Multiphasic Microfluidic Liquid Chromatography Chip Improves Reproducibility and Detection Limits for Quantitation in Discovery and Targeted Proteomics"; Molecular & Cellular Proteomics Jun. 1, 2015, First published on Apr. 7, 2015, 14 (6) 1708-1719; https://doi.org/10.1074/mcp.M114.046425.

G.J. Opiteck et al: "Comprehensive On-Line LC/LC/MS of Proteins"; Anal Chem. Apr. 15, 1997;69(8):1518-24; https://doi.org/10.1021/ac9611551.

K. Fujii et al: "Fully automated online multi-dimensional protein profiling system for complex mixtures"; Journal of Chromatography A; vol. 1057, Issues 1-2, 2004, pp. 107-113, ISSN 0021-9673; https://doi.org/10.1016/j.chroma.2004.09.078.

Y. Shen et al: "Online 2D-LC-MS/MS Assay To Quantify Therapeutic Protein in Human Serum in the Presence of Pre-existing Antidrug Antibodies"; Anal Chem. Aug. 18, 2015;87(16):8555-63; https://doi.org/10.1021/acs.analchem.5b02293.

Z. Tian et al: "Two-dimensional liquid chromatography system for online top-down mass spectrometry"; Proteomics 2010, 10, 3610-3620; First published:Sep. 2, 2010 https://doi.org/10.1002/pmic.201000367.

* cited by examiner

| Column packing | Brand | Type | Cation exchange | | | | | | Anion exchange | | | | |
|---|---|---|---|---|---|---|---|---|---|---|---|---|---|
| | | | Leu | Glu | Arg | Hpx | Choline | Score | Lactate | Malate | Citrate | Indoxyl sulfate | Score |
| Low performance | Hysphere | Strong | 2 | 2 | -2 | 2 | -3 | 1 | -1 | 2 | 2 | -3 | 0 |
| | Oasis | Weak | 0 | 0 | 1 | 0 | -2 | -1 | 1 | 2 | 2 | -3 | 2 |
| High performance | Sepax | Strong | -1 | -1 | 2 | -1 | 1 | 6 | 1 | 2 | -2 | -3 | -2 |
| | Sepax | Weak | 0 | 0 | 0 | 0 | 0 | 0 | 1 | 2 | 2 | 3 | 8 |
| | Zirchrom | Strong | 0 | 2 | -1 | 0 | 0 | 1 | -3 | -3 | -3 | -3 | -12 |
| | Zirchrom | Weak | 1 | -2 | 2 | 0 | 1 | 2 | -2 | -2 | -2 | 2 | -4 |

Figure 4

| Internal standards | LLOQ (µM) | | | Physiological level (µM) |
|---|---|---|---|---|
| | FIA | Frac | LC | |
| Val-D8 | 176 | 1 | 10 | 212 |
| Leu-D3 | 171 | 2 | 10 | 61 |
| Trp-13C11, 15N2 | 90 | 1 | 5 | 55 |
| TMAO-D9 | 44 | 1 | 0.1 | 38 |
| Orn-D6 | 240 | 10 | 5 | 67 |
| Carnitine-D3 | 2 | 0.03 | 0.06 | 46 |
| Phe-D5 | 82 | 4 | 5 | 78 |
| Arg-15N2 | 11 | 0.5 | 5 | 114 |
| Ala-D3 | ** | 27 | 20 | 427 |
| Glu-13C2 | ** | 1 | 5 | 97 |
| Lys-D4 | 22 | 4 | 10 | 179 |
| Gln-D5 | 1345 | 4 | 20 | 510 |
| Glucose-13C6 | 26 | 10 | 11 | 4971 |
| Choline-D4 | 2 | 0.1 | 0.1 | 15 |
| Creat-D3 | 18 | 0.3 | 10 | 87 |
| C8 carnitine-D3 | 0.3 | 0.003 | 0.006 | 0.2 |
| Citrate-D4 | 6 | 1 | 0.2 | 114 |
| Malate-13C4 | 2 | 0.9 | 0.2 | 3.2 |
| Lactate-13C3 | 71 | 13 | 3 | 1489 |
| Pyruvate-13C3*** | 15 | 9 | 1 | 35 |
| FA(16:0)-D2 | 1.3 | 0.7 | 0.8 | 122 |
| FA(18:0)-D3 | 0.6 | 0.6 | 0.07 | 49 |

APPARATUS COMPRISING A GUARD COLUMN

This invention relates to a chromatography analysis apparatus and a method of carrying out a chromatography analysis procedure.

Chromatography is used to separate constituents of a mixture in order to analyse the different constituents.

According to a first aspect of the invention, there is provided a chromatography analysis apparatus comprising:
  a fractionation device for receiving a sample, the fractionation device defining a sample flow path that includes a guard column; and
  a fractionation output analyser,
    wherein a fractionation output of the guard column is provided to an input of the fractionation output analyser for enabling subsequent analysis of the fractionation output by the fractionation output analyser.

The configuration of the chromatography analysis apparatus of the invention enables a chromatographic fractionation output of a guard column to be directly provided to a fractionation output analyser for subsequent analysis. Such configuration of the chromatography analysis apparatus of the invention omits the inclusion or use of an intermediate analytical column between the guard column and the fractionation output analyser.

In conventional chromatography, an analytical column is used to separate a biological sample prior to a mass spectrometer. Long analytical columns, typically in the range of 10 to 15 cm or longer, are conventionally required to achieve the separation power needed to obtain meaningful mass spectrometry measurements.

A guard column is structurally and functionally different from an analytical column. Firstly, guard columns are much shorter than analytical columns. Secondly, the function of a guard column is to protect the analytical column, which is achieved by connecting the guard column in front of the analytical column so that the guard column acts as a filter that prevents harmful particles from entering the analytical column. Hence, conventional chromatography does not rely on the guard column to achieve the required separation of the biological sample prior to a mass spectrometer.

However, contrary to conventional wisdom, the inventors have come up with a working chromatography analysis apparatus based on the analysis of a chromatographic fractionation output of a guard column that provides high performance sample fractionation and analysis that are of comparable quality to traditional chromatography based on longer analytical columns. In comparison to traditional chromatography based on longer analytical columns, the use of the shorter guard column in the invention enables faster fractionation times to reduce overall sample analysis times without any significant comparative loss in sensitivity. In addition, the inventors have found that the chromatography analysis apparatus of the invention has comparable clean-up efficiency with respect to conventional chromatography methods that are usually tailored to one specific compound class.

The use of the shorter guard column, or a combination of shorter guard columns, also allows the invention to have a more compact configuration that is conducive to the design of the invention as a portable or mobile apparatus. Moreover, guard columns due to their considerably cheaper costs are more easily replaced than analytical columns.

The chromatography analysis apparatus of the invention therefore provides a fast and comprehensive way of carrying out sample fractionation and analysis that significantly reduces the cost of sample analysis, which is of particular benefit to high-throughput applications (e.g. pharmaceuticals, research, screening, drug monitoring and drug development). The invention may be applied to a wide range of technical fields, such as metabolomics and other omic sciences, and a wide range of samples such as bodily fluids (blood, urine, sweat), tissues and in-vitro models (medium, cells, cell content).

In embodiments of the invention, the guard column may have a column length of less than 3 cm, preferably a column length in the range from 0.5 cm to 1.0 cm.

The type of guard column may vary so long as the guard column is capable of carrying out sample fractionation. The choice of sorbent chemistry for the guard column depends on the requirements of the fractionation process. In one example, the guard column may be a solid-phase extraction column. In another example, the guard column may be selected from a group consisting of a reversed-phase guard column, an anion-exchange guard column and a cation-exchange guard column. Alternatively, the guard column may have a sorbent chemistry that is a combination of multiple sorbent chemistries. The multiple sorbent chemistries may include, but are not limited to, reversed-phase sorbent chemistry, anion-exchange sorbent chemistry and/or cation-exchange sorbent chemistry. The anion-exchange guard column may be a weak or strong anion-exchange guard column. The cation-exchange guard column may be a weak or strong cation-exchange guard column.

In embodiments of the invention, the sample flow path may include a plurality of guard columns. The provision of multiple guard columns in the sample flow path may be used to increase the performance of the chromatography analysis apparatus of the invention, such as higher signal quality, better repeatability and less ion suppression. The number of guard columns in the sample flow path may vary depending on the requirements of the fractionation process. In a preferred embodiment of the invention, the guard columns are three in number.

In embodiments of the invention employing the use of multiple guard columns, the guard columns may have different sorbent chemistries. The different sorbent chemistries may be a reversed-phase sorbent chemistry, an anion-exchange sorbent chemistry and a cation-exchange sorbent chemistry respectively. Having a plurality of guard columns in the sample flow path permits use of different sorbent chemistries to obtain different fractionation outputs. For example, multiple guard columns with different sorbent chemistries may be used to facilitate a fractionation approach based on polarity and charge.

In further embodiments of the invention, the guard columns may be serially connected to define a cascade arrangement of the guard columns. A fractionation output of the cascade arrangement of the guard columns may be provided to an input of the fractionation output analyser for enabling subsequent analysis of the fractionation output by the fractionation output analyser.

The number and sorbent chemistries of the cascaded guard columns may be designed to obtain a desired combined fractionation output, non-limiting examples of which are described as follows.

In a first example, the guard columns may include a reversed-phase guard column and at least one ion-exchange guard column. The cascade arrangement of the guard columns may include the reversed-phase guard column followed by the at least one ion-exchange guard column.

In a second example, the guard columns may include a reversed-phase guard column, an anion-exchange guard column and a cation-exchange guard column. The cascade arrangement of the guard columns may include the reversed-phase guard column followed by the anion-exchange guard column followed by the cation-exchange guard column.

The plurality of guard columns may include a first guard column coupled on-line or off-line with a second guard column so that a fractionation output of the first guard column is provided to an input of the second guard column.

In still further embodiments of the invention, the sample flow path may include a flow valve arrangement. The flow valve arrangement may include a flow valve operatively coupled to the guard column so that, in use, the flow valve is operable to selectively switch the guard column into and out of the sample flow path.

In such embodiments in which multiple guard columns are employed, the flow valve arrangement may include a plurality of flow valves. Each flow valve may be operatively coupled to a respective one of the plurality of guard columns so that, in use, each flow valve is operable to selectively switch the corresponding guard column into and out of the sample flow path.

The inclusion of the flow valve arrangement in the sample flow path enables various operating modes of the fractionation device to provide a chromatography analysis apparatus that is capable of carrying out a broad range of fractionation processes for a wide range of samples, which in turn permits optimisation of the fractionation process for a given sample. Particularly, the flow valve arrangement permits selection of one or more guard columns with sorbent chemistries that are compatible with the target fractionation process and sample. Such selection may be carried out in an automated manner. This obviates the need to either provide multiple chromatography analysis apparatus for different fractionation processes or different samples, or replace one or more parts of the chromatography analysis apparatus each and every time a new fractionation process is required or a new sample is tested, which not only adds costs but also increases overall sample analysis times.

The use of one or more short guard columns in the invention is conducive to achieving fast switching of the or each guard column in and out of the sample flow path in order to decrease overall sample analysis times and achieve high-throughput fractionation and analysis of a high number of samples, which would not be readily feasible with longer analytical columns. Furthermore, the use of the longer analytical columns would require a larger, bulkier and more complex flow valve arrangement that has its downsides in terms of cost, resource consumption, footprint, user-friendliness and portability. For example, it takes longer to equilibrate and flush conventional liquid chromatography (LC) analytical columns than guard columns due to the required amount of flushing solvent being dependent on the column length, which in turn increases the overall analysis time. Besides, LC pumps are incapable of pumping solvents through multiple conventional LC analytical columns because the backpressure would be too high.

Non-limiting examples of the chromatography analysis apparatus having the flow valve arrangement are described as follows.

In one example, the guard columns may further include a reversed-phase guard column that is configured to be permanently in-line in the sample flow path.

In another example, the guard columns may include at least one ion-exchange guard column. The flow valve arrangement may include at least one flow valve operatively coupled to the ion-exchange guard column or at least one of the ion-exchange guard columns so that, in use, the or each flow valve is operable to selectively switch the corresponding ion-exchange guard column into and out of the sample flow path.

The invention may be used for carrying out on-line or off-line processing of the fractionation output.

In embodiments of the invention, the guard column may be coupled on-line with the fractionation output analyser so that a fractionation output of the guard column is provided to an input of the fractionation output analyser for enabling subsequent on-line analysis of the fractionation output by the fractionation output analyser.

In other embodiments of the invention, the guard column may be coupled off-line with the fractionation output analyser so that a fractionation output of the guard column is provided to an input of the fractionation output analyser for enabling subsequent off-line analysis of the fractionation output by the fractionation output analyser.

Different types of fractionation output analysers may be used in the invention. For example, the fractionation output analyser may include a mass spectrometer or a nuclear magnetic resonance spectrometer.

In embodiments of the invention, the fractionation output analyser may include an ioniser configured to, in use, ionise the fractionation output for subsequent analysis by the fractionation output analyser. The ioniser may be, for example, an electrospray ioniser or an atmospheric pressure ioniser.

According to a second aspect of the invention, there is provided a method of carrying out a chromatography analysis procedure, the method comprising the steps of:
 providing a sample to a fractionation device, the fractionation device defining a sample flow path that includes a guard column;
 carrying out a fractionation of the sample using the guard column;
 providing a fractionation output of the guard column to an input of the fractionation output analyser.

The features and advantages of the first aspect of the invention and its embodiments apply mutatis mutandis to the second aspect of the invention and its embodiments.

The method of the invention may include the step of analysing the fractionation output by the fractionation output analyser.

In the method of the invention, the guard column may have a column length of less than 3 cm.

In the method of the invention, the guard column may have a column length in the range from 0.5 cm to 1.0 cm.

In the method of the invention, the guard column may be a solid-phase extraction column.

In the method of the invention, the guard column may be selected from a group consisting of a reversed-phase guard column, an anion-exchange guard column (e.g. a weak or strong anion-exchange guard column) and a cation-exchange guard column (e.g. a weak or strong cation-exchange guard column).

In the method of the invention, the sample flow path may include a plurality of guard columns. Such a method may include the step of carrying out a fractionation of the sample using the plurality of guard columns. Preferably, in the method of the invention, the guard columns may be three in number.

In the method of the invention, the guard columns may have different sorbent chemistries. The different sorbent chemistries may be a reversed-phase sorbent chemistry, an anion-exchange sorbent chemistry and a cation-exchange sorbent chemistry respectively.

In the method of the invention, the guard columns may be serially connected to define a cascade arrangement of the guard columns. Such a method may include the steps of carrying out a fractionation of the sample using the cascade arrangement of the guard columns, and providing a fractionation output of the cascade arrangement of the guard columns to an input of the fractionation output analyser.

In such embodiments of the method of the invention, the guard columns may include a reversed-phase guard column and at least one ion-exchange guard column. The cascade arrangement of the guard columns may include the reversed-phase guard column followed by the at least one ion-exchange guard column.

In further such embodiments of the method of the invention, the guard columns may include a reversed-phase guard column, an anion-exchange guard column and a cation-exchange guard column. The cascade arrangement of the guard columns may include the reversed-phase guard column followed by the anion-exchange guard column followed by the cation-exchange guard column.

The method of the invention may include the step of selectively switching the or each guard column into and out of the sample flow path. When the sample flow path includes multiple guard columns, the method may include the step of selectively switching each guard column into and out of the sample flow path.

In the method of the invention, the guard columns may further include a reversed-phase guard column that is configured to be permanently in-line in the sample flow path.

In the method of the invention, the guard columns may include at least one ion-exchange guard column. Such a method may include the step of selectively switching the or each ion-exchange guard column into and out of the sample flow path.

In some embodiments of the invention, the method may include the step of carrying out on-line coupling of the guard column with the fractionation output analyser to provide a fractionation output of the guard column to an input of the fractionation output analyser. In such embodiments, the method of the invention may further include the step of carrying out on-line analysis of the fractionation output by the fractionation output analyser.

In other embodiments of the invention, the method may include the step of carrying out off-line coupling of the guard column with the fractionation output analyser to provide a fractionation output of the guard column to an input of the fractionation output analyser. In such embodiments, the method of the invention may further include the step of carrying out off-line analysis of the fractionation output by the fractionation output analyser.

In the method of the invention, the fractionation output analyser may include a mass spectrometer or a nuclear magnetic resonance spectrometer.

The method of the invention may include the step of generating an electrospray of the fractionation output.

It will be appreciated that the use of the terms "first" and "second", and the like, in this patent specification is merely intended to help distinguish between similar features, and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

Preferred embodiments of the invention will now be described, by way of non-limiting examples, with reference to the accompanying drawings in which:

FIGS. 4 to 8 illustrate the performance of the chromatographic analysis apparatus of FIG. 3.

The figures are not necessarily to scale, and certain features and certain views of the figures may be shown exaggerated in scale or in schematic form in the interests of clarity and conciseness.

Figure 1:
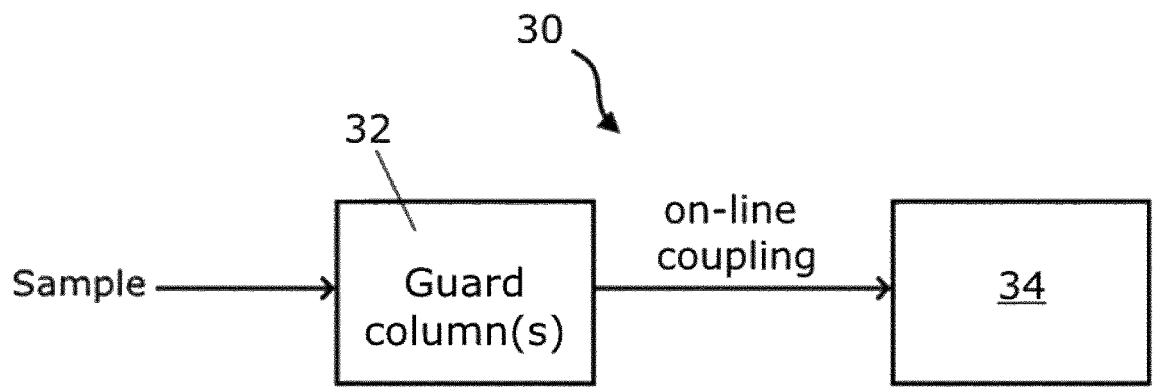
FIG. 1 shows a chromatographic analysis apparatus according to a first embodiment of the invention.

A chromatography analysis apparatus according to a first embodiment of the invention is shown in FIG. 1 and is designated generally by the reference numeral 30.

The chromatography analysis apparatus 30 comprises a fractionation device 32 and a fractionation output analyser 34.

The fractionation device 32 defines a sample flow path that includes at least one guard column. In other embodiments, the sample flow path may include at least two guard columns. When the sample flow path includes a plurality of guard columns, the guard columns may be serially connected as a cascade arrangement of the guard columns. Preferably the or each guard column has a column length of less than 3 cm, more preferably a column length in the range from 0.5 cm to 1.0 cm.

In use, a sample is received by the fractionation device 32 and passes through the guard column(s), thus undergoing fractionation due to the sorbent chemistry of the guard column(s) before exiting the fractionation device 32 as a fractionation output. When the sample flow path includes the cascade arrangement of the guard columns, the sample passes through the cascaded guard columns in sequential order, thus undergoing fractionation due to the sorbent chemistry of each guard column. The or each guard column is packed with sorbents so as to be configured to have a particular sorbent chemistry. The choice of sorbent chemistry for the or each guard column depends on the requirements of the fractionation process. The or each guard column may be a solid-phase extraction column, a reversed-phase guard column, a weak or strong anion-exchange guard column, or a weak or strong cation-exchange guard column.

When multiple guard columns are employed, the chromatography analysis apparatus 30 may further include a flow valve arrangement having one or more flow valves. The or each flow valve may be operatively coupled to one or more of the plurality of guard columns so that, in use, the or each flow valve is operable to selectively switch the corresponding guard column into and out of the sample flow path to alter the fractionation capability of the fractionation device 32. If a given guard column is switched into the sample flow path, then the sample passing through the sample flow path also passes through the switched-in guard column. If a given guard column is switched out of the sample flow path, then the sample passing through the sample flow path bypasses the switched-out guard column.

The fractionation output is provided directly to an input of the fractionation output analyser 34 for subsequent analysis of the fractionation output by the fractionation output analyser 34. The fractionation output analyser 34 may include an electrospray ioniser (not shown) configured to, in use, generate an electrospray of the fractionation output.

It will be understood that there is no need for additional fractionation using an intermediate analytical column between the or each guard column and the fractionation output analyser 34.

The guard column, or the cascade arrangement of the guard columns, is coupled on-line with the fractionation output analyser 34 so that the fractionation output is provided to an input of the fractionation output analyser 34 for enabling subsequent on-line analysis of the fractionation output by the fractionation output analyser 34. FIG. 1 schematically shows the on-line coupling between the fractionation device 32 and the fractionation output analyser 34.

Figure 2:
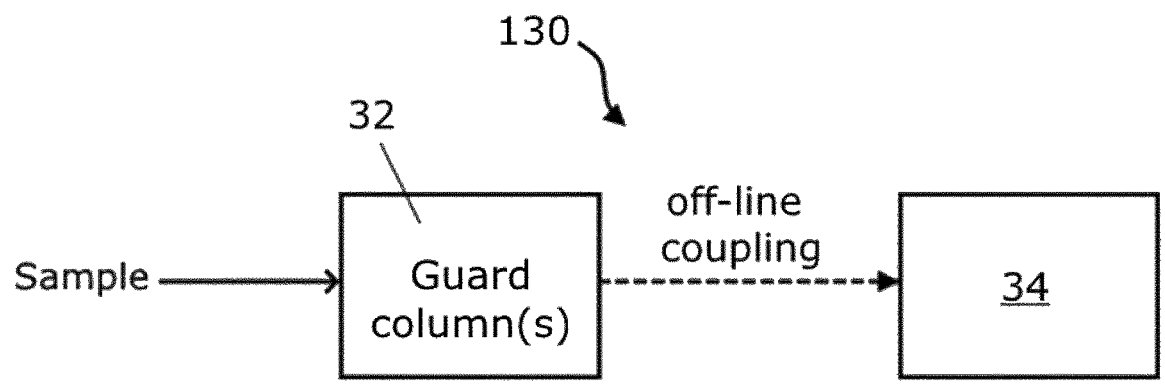
FIG. 2 shows a chromatographic analysis apparatus according to a second embodiment of the invention.

A chromatography analysis apparatus 30 according to a second embodiment of the invention is shown in FIG. 2 and is designated generally by the reference numeral 130. The chromatography analysis apparatus 130 of FIG. 2 is similar in structure and operation to the chromatography analysis apparatus 30 of FIG. 1, and like features share the same reference numerals.

The chromatography analysis apparatus 130 of FIG. 2 differs from the chromatography analysis apparatus 30 of FIG. 1 in that, in the chromatography analysis apparatus 130 of FIG. 2, the guard column, or the cascade arrangement of the guard columns, is coupled off-line with the fractionation output analyser 34 so that a fractionation output of the guard column is provided to an input of the fractionation output analyser 34 for enabling subsequent off-line analysis of the fractionation output by the fractionation output analyser 34.

The fractionation output may be provided directly to an input of, for example, a mass spectrometer (MS) or a nuclear magnetic resonance spectrometer (NMR). The guard column, or the cascade arrangement of the guard columns, may be coupled on-line or off-line with the MS or NMR.

When the coupling is performed on-line with the fractionation output analyser 34, additional separation between fractions in the fractionation output may occur. When the sample passes through the fractionation device 32, compounds will experience chemical interactions with the guard column(s). Due to different chemical properties of the compounds, the resultant retention times can be different. As a result, separated fractions would enter the fractionation output analyser 34.

When the coupling is performed off-line with the fractionation output analyser 34, the fractions are collected off-line before being provided to the fractionation output analyser 34. The off-line collection may be carried out using, for example, a vial, a multi-well plate or a segmented flow. The off-line collection of the fractions results in the loss of the additional separation between the fractions in the fractionation output.

Both on-line and off-line coupling have their respective benefits. The former permits more accurate sample analysis while the latter provides better flexibility in collecting the fractionation output and carrying out the subsequent analysis at different locations and/or different times.

In addition to differences in chemical properties of compounds, high performance columns (preferably with particle size≤5 µm) are used to achieve good separation.

An exemplary application of the chromatography analysis apparatus of the invention is described in detail as follows. The following embodiment of the invention is described with reference to high-throughput fractionation coupled to mass spectrometry for quantitative metabolomics. It will be appreciated that the following embodiment of the invention applies mutatis mutandis to other embodiments of the invention that employ the use of other types of guard columns and fractionation output analysers and are carried out in other technical fields (such as other 'omic' sciences).

Metabolomics is emerging as an important field in life sciences. It is used for the screening of inborn errors of metabolism, precision medicine and discovery of new biomarkers for health, disease and intervention. Mass spectrometry (MS) is a highly sensitive technique and MS-based methods can screen a large range of metabolites in a single run, which makes MS highly suitable for comprehensive metabolomics. The downside of MS is that it often requires extensive sample preparation and separation to reduce interferences of complex biological samples at the ionisation source. Also, a weakness of current MS-based metabolomics platforms is the time-consuming analysis and the occurrence of severe matrix effects in complex mixtures that decreases performance.

The chromatography analysis apparatus of the invention was configured as an automated and fast fractionation device coupled on-line to an MS. The different sorbent chemistries of the guard columns resulted in an efficient interaction with a wide range of metabolites based on polarity and charge and allocation of important matrix interferences like salts and phospholipids. The use of short guard columns and flow valves allowed for fast screening (3 min per polarity). In total, 50 commonly-reported diagnostic or explorative biomarkers were validated with a limit of quantification that was comparable with conventional LC-MS and MS methods. In comparison with flow injection analysis (FIA) without fractionation, ion suppression decreased from 89% to 25% and the sensitivity was 21 times higher. The validated method was used to investigate the effects of circadian rhythm and food intake on several metabolite classes. The significant diurnal changes that were observed stress the importance of standardized sampling times and fasting states when metabolite biomarkers are used. The invention enabled a fast approach for global profiling of the metabolome.

The invention utilises two important chemical properties of the metabolome (and small molecules in general): polarity and charge. The fractionation device includes a cascade arrangement of three serially connected guard columns in the form of three consecutive high performance (particle size≤5 µm) SPE guard columns. The SPE guard columns consist of a reversed-phase sorbent chemistry, an anion-exchange sorbent chemistry and a cation-exchange sorbent chemistry. This ensured the allocation of metabolites into different fractions (flow-through; polar/neutral, reversed-phase; apolar, cation-exchange; polar and positive, anion-exchange; polar and negative). Moreover, it also removed known ion suppressors from different fractions minimising their adverse effects during electrospray ionisation. Phospholipids and salts are held responsible for a majority of signal suppression during electrospray ionisation of plasma samples. By using a fractionation approach based on polarity and charge, phospholipids are retained on the reversed-phase guard column whereas positive and negative salt ions are trapped on and eluted from the anion-exchange and cation-exchange guard columns respectively. Another benefit of serially coupled guard columns is the flow-through fraction, which is cleaned by three sorbent chemistries instead of one sorbent chemistry in conventional single analytical column methods.

The invention was used as a targeted platform for the analysis of 50 commonly-reported diagnostic or explorative biomarkers. These compounds belong to the following compound classes: amino acids, amines, purines, sugars, acylcarnitines, organic acids and fatty acids (FA). Several on-line SPE guard columns have been evaluated for their ability to fractionate these compound classes in plasma prior to MS analysis. The optimised methods for both positive and negative electrospray ionisation modes have been validated and applied in a study investigating the effect of circadian rhythm and food intake on several metabolite classes. The study gives insight into the diurnal variations of the studied biomarkers, which are important to assess because their misinterpretation as disease or intervention related variations compromises the diagnostic and explorative power of a potential biomarker.

Materials & Methods

Chemicals

An overview of the used (internal) standards and concentrations is provided in the Supplementary information (Tables S1 and S2). Methanol (Ultra-LC-MS grade) was sourced from ActuAll (Oss, The Netherlands). Ammonium hydroxide (28-30 wt % solution of ammonia in water) and formic acid (98%+) were sourced from Acros Organics (Bleiswijk, The Netherlands). Ammonium acetate (≥99.0%) and ammonium formate (≥99.995%) were sourced from Sigma-Aldrich (Zwijndrecht, The Netherlands).

Method Development

Several ion-exchange guard columns have been evaluated according to the retention, trapping and elution performances of representative standards. We tested four low performance (particle size>5 µm), four high performance Sepax (particle size 1.7-5 µm) and four high performance Zirchrom (particle size 3 µm) SPE guard columns. The low performance, Sepax and Zirchrom SPE guard columns were composed of four mixed-mode ion-exchange types (strong cation-exchange (SCX), strong anion-exchange (SAX), weak cation-exchange (WCX) and weak anion-exchange (WAX)). Similar loading and elution buffers were used for each type of ion-exchange. The evaluated ion-exchange guard columns, loading and elution buffers explored during development can be found in the Supplementary information (Table S3). The selected ion-exchange guard columns were coupled to a reversed-phase guard column and ordered in a way that was most beneficial in terms of matrix effect reduction and peak shape. The reversed-phase guard column was a ZORBAX Extend-C18, 2.1 mm×5 mm, 1.8 µm guard column from Agilent Technologies Netherlands (Waldbronn, The Netherlands).

Five cationic compounds were used to represent different types of cations (leucine, glutamic acid, arginine, hypoxanthine and choline) and four anionic compounds were used to represent different types of anions (lactic acid, malic acid, citric acid and indoxyl sulfate). The amino acids consisted of cationic and anionic functional groups. Glucose functioned as a neutral marker and indicated whether ions were efficiently removed from the guard column flow-through.

Validation

Individual stock solutions and calibration mixtures were stored at −80° C. In each specific fraction, there was at least one internal standard present. In total seven calibration points were used (C1-C7). The highest calibration concentration is referred to as C7 (Supplementary information Table S1) and the subsequent concentrations were 1:1 dilutions of the previous concentration. All calibration standards were included in the same stock solution and all calibration solutions were composed of 69% methanol in water. C0 was prepared by adding 69% MeOH without standards. Within the calibration range, C4 and the internal standard concentration were set to mimic the physiological concentration of the analyte found on the Human Metabolome Database (HMDB). Calibration curves were constructed by standard addition of the calibration standards to plasma samples. The repeatability of the method was determined by the relative standard deviation of three replicates of three different concentrations (C0, C2 and C4). The intermediate precision was determined by the relative standard deviation of three different concentrations (C0, C2 and C4) on three different days. The matrix effect was determined by the ratio of the peak area of the internal standard in a plasma and water sample. Ion suppression was determined by subtracting 100% by the matrix effect. Ion suppression of ion enhanced compounds was set at 0%.

$$\text{Matrix effect} = \frac{\text{Area ISTD in plasma}}{\text{Area ISTD in water}} \times 100\% \quad (1)$$

$$\text{Ion suppression} = 100\% - \text{Matrix effect} \quad (2)$$

The carryover was evaluated as the ratio of the peak area in a blank sample and the peak area in a pooled plasma sample that was analysed just before the blank (N=3). Ten concentration levels of internal standards were used to determine the limit of detection (LOD) and lower limit of quantification (LLOQ). The highest concentration was C6 which was 4 times the physiological value of the unlabelled counterpart (Supplementary information Table S2) and the subsequent concentrations were 1:1 dilutions of the previous concentration. The LOD (formula 3) and LLOQ (formula 4) were determined by the following formula that used the peak area of a blank, the standard deviation (SD) of the lowest concentration with a S/N greater than 3 ($C_{low}$) and the response factor (RF), which was calculated by the ratio of the peak area and concentration of $C_{low}$.

$$LOD = \frac{3 \times SD_{area\ Clow} + \text{area}_{Blank}}{\left(\frac{\text{area}_{C_{low}}}{[C_{low}]}\right)} \quad (3)$$

$$LLOQ = \frac{10 \times SD_{areaC_{low}} + \text{area}_{Blank}}{\left(\frac{\text{area}_{C_{low}}}{[C_{low}]}\right)} \quad (4)$$

Sample Preparation

During the method validation, 30 µL EDTA plasma aliquots were mixed with 75 µL of methanol, 60 µL of calibration standard and 30 µL of the internal standard solution. The mixture was vigorously vortexed and centrifuged (10 min, 16100 g, 4° C.). After centrifugation, 100 µL of the supernatant was transferred into an autosampler vial containing a 150 µL insert. Study samples were prepared by mixing 15 µL EDTA plasma with 37.5 µL of methanol, 30 µL of 69% methanol and 15 µL of internal standard solution (same ratios as during method validation). The vortex and centrifuge step remained the same and 50 µL of the supernatant was transferred into an autosampler vial containing a 150 µL insert.

For the flow injection analysis (FIA) sample preparation, ten microliters of EDTA plasma and internal standard solution were mixed with methanol, water and acetic acid to reach a final solution of 80% methanol, 0.1% acetic acid and a plasma dilution ratio of 100. This dilution ratio was found to give the highest sensitivity after testing plasma dilution ratios of 10 to 500. An adjusted Bligh and Dyer LLE was also performed prior to the FIA. Ten microliters of EDTA plasma and internal standard solution were extracted with methanol, dichloromethane and water (v/v/v, 2/2/1.8) reaching a total volume of 1000 µL. 200 µL of the apolar and polar fraction were evaporated and reconstituted in 200 µL 0.1% acetic acid in 80% MeOH.

Fractionation and Mass Spectrometry

Figure 3:
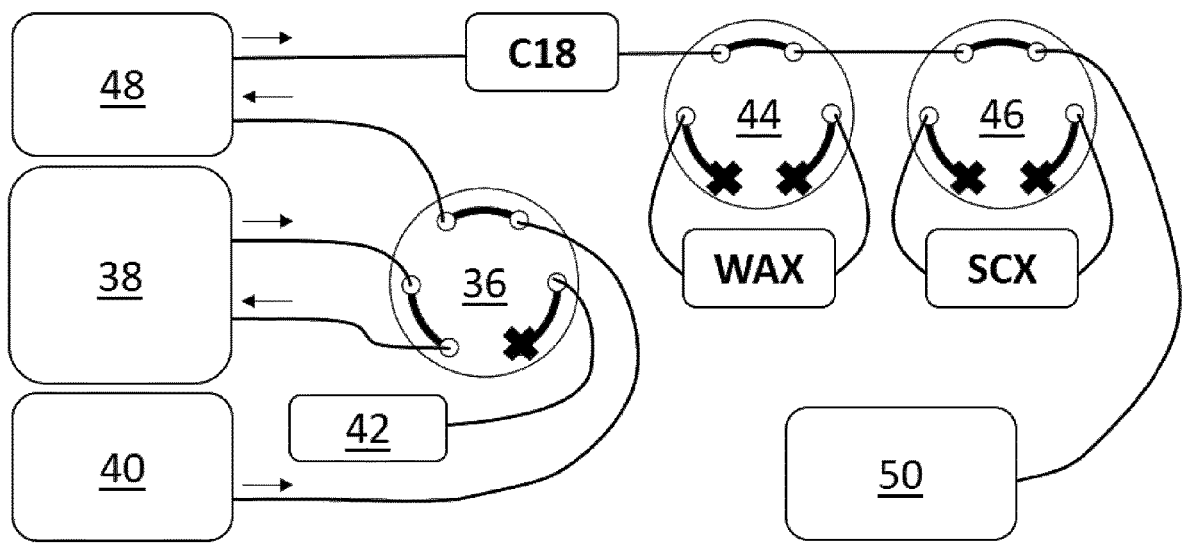
FIG. 3 shows a chromatographic analysis apparatus according to a third embodiment of the invention.

FIG. 3 shows a schematic representation of the chromatography analysis apparatus. A first flow valve 36 is configured to switch between an ion-exchange elution (IEX) pump 38 and a gradient pump 40. The first flow valve 36 is additionally connected to a waste collection point 42. A second flow valve 44 is configured to selectively switch a weak anion-exchange guard column (WAX) into and out of the sample flow path. A third flow valve 46 is configured to selectively switch a strong cation-exchange guard column (SCX) into and out of the sample flow path. The flow valves 36,44,46 in FIG. 3 are six-port flow valves. A reversed-phase guard column (C18) is permanently in-line in the sample flow path.

When all three guard columns are in the sample flow path, the C18 guard column is followed by the WAX guard column followed by the SCX guard column. In use, the C18 guard column receives a sample from an auto-sampler 48, and a fractionation output is provided to a Sciex X500R QToF MS 50.

The injection volume and flow rate of the sample was set at 1 µL and 800 µL/min respectively. In positive mode, the C18, WAX and SCX guard columns were loaded consecutively. The mobile phases consisted of 0.2% formic acid in water for loading (gradient pump: A), 2 mM ammonium acetate in methanol for the C18 elution (gradient pump: B) and 100 mM ammonium acetate pH 10 for ion-exchange elution (IEX pump). In negative mode, the C18 and WAX guard columns were loaded consecutively. The mobile phases consisted of 2 mM ammonium acetate in water for loading (gradient pump: A), 2 mM ammonium acetate in methanol (gradient pump: B) for the C18 elution and 100 mM ammonium formate pH 10.5 for ion-exchange elution (IEX pump). When the gradient pump was selected, the IEX pump pumped the solvent back to the solvent bottle. When the IEX pump was selected, the gradient pump flow was directed to the waste collection point 42. By using the second and third flow valves 44,46, the WAX and SCX are switchable into and out of the sample flow path. The total runtime was 3 min and the detailed timetable of the fractionation in positive and negative modes can be found in the Supplementary information (Tables S4 and S5).

In the FIA method, the injection volume and flow rate of the sample was set at 20 µL and 80 µL/min respectively. The mobile phase consisted of 80% methanol in water. At 0.8 minutes, the flow rate was increased to 800 µL/min for 0.5 minutes in order to flush the system and at 1.3 minutes the flow rate returned to 80 µL/min. The total analysis time was 1.4 minutes. The MS parameters can be found in the Supplementary information (Table S6).

Effect of Circadian Rhythm and Food Intake on Metabolite Classes

The effect of circadian rhythm and food intake on the metabolite classes was evaluated for ten healthy male volunteers (aged 18-45 years). Blood samples were collected over 24 hours under uniform conditions for food intake, physical activity and night rest. At each time point, 20 mL of blood was drawn into two 10 mL BD Vacutainer® K2 EDTA tubes and kept on ice. The tubes were gently inverted multiple times and centrifuged (1000 g, 15 min, 4° C.). Plasma samples were aliquoted and stored at −80° C. prior to analysis. A quality control (QC) was prepared by pooling 15 µL of every individual study sample. A QC sample was analysed every 10 samples. Metabolites with an RSD below 15% throughout the QC samples were included in the data analysis.

Each metabolite was normalised on the first time point and subsequently log-transformed using the natural logarithm. Then, the metabolites were allocated to six different compound classes (amino acids, amines, hexose, acylcarnitines, organic acids or fatty acids). An overview of the compound classes is provided in the Supplementary information (Table S7). Within each compound class, all metabolite concentrations were averaged per time point and volunteer. A Wilcoxon Signed Rank test was used to assess the change in this mean per time point relative to the baseline. A multiple comparisons correction (Benjamini-Yekutieli procedure, <0.1) was used to adjust the probability values (p-value) for multiple testing. All statistical analyses were performed in R.

Results and Discussion

Method Development

The invention was developed as a way of minimising matrix effects, focusing on salt and (phospho)lipid removal. Lipid removal was accomplished by a reversed-phase guard column and salt removal by ion-exchange guard columns. An Agilent ZORBAX Extend-C18 UPLC guard column was selected as the reversed-phase guard column because it demonstrated superior separation and peak shape over low performance SPE guard columns.

FIG. 4 provides an overview of the evaluated performances of different mixed-mode cation and anion exchange columns. The grading scheme is depicted by numbers indicating good (positive) or bad (negative) performances. The grading scheme is as follows: elution at dead time: 0; retention: 1; trapped and eluted: 2; trapped and separated during elution: 3; no peak visible: −3; extreme tailing: −2; breakthrough: −1.

FIG. 4 indicates that the WCX guard columns have a relatively low trapping efficiency as most of the analytes eluted at the dead time (grade 0). Most of the analytes were efficiently retained or trapped (grades 1 and 2 respectively) by the SCX guard columns. However, choline could not be eluted in the Hysphere guard column and arginine caused breakthrough (grade −1) in the Zirchrom guard column indicating a superior performance of the Sepax guard column. The right part of FIG. 4 shows that all SAX guard columns did not allow the desorption of indoxyl sulfate (grade −3) indicating that this type of anion-exchange guard column could be exhausted over time due to the irreversible binding of analytes. The Sepax WAX was suitable for all representative analytes, whereas the Oasis guard column was too strong (grade −3 for indoxyl sulfate) and the Zirchrom guard column repeatedly resulted in extreme tailing (grade −2). The Sepax SCX and WAX guard columns were unsurpassed in terms of retention and trapping and allowed for the analysis of all representative compounds. Therefore, these guard columns are preferred for the trapping of the ionic species. The combination of WAX and SCX guard columns also provided the possibility to use a similar elution buffer for both guard columns. The elution from a WAX guard column requires a high pH in order to remove the positive charge on the sorbent, whereas the high pH removes the positive charge of the analytes during the elution of an SCX guard column. Besides, the high pH is accomplished by the use of ammonia, which is a suitable counter ion for an SCX guard column.

The silica material of the ZORBAX Extend-C18 guard column was end-capped with methyl groups which made the sorbent resistant to high pH. Therefore, this particular guard column could be permanently in-line with the flow of the sample in the sample flow path. The IEX guard columns were preferably switched out of the sample flow path during C18 elution to improve retention. In negative mode, the WAX elution profile was better in the absence of the SCX guard column. Since the SCX guard column did not contribute to the reduction of ion suppression in negative mode, the SCX guard column is preferably switched out of the sample flow path during the negative mode.

Fractionation Characteristics

Figure 5:
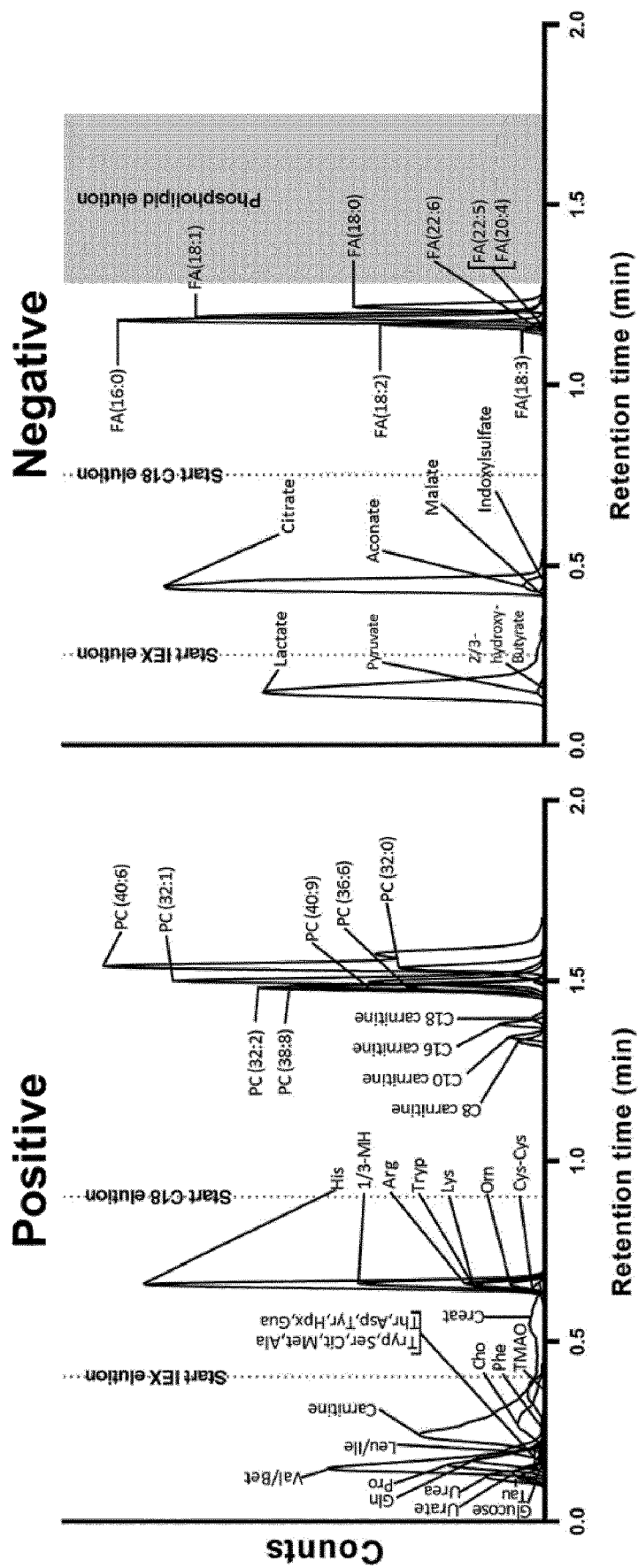

FIG. 5 shows the ion chromatograms of a pooled plasma sample measured with the chromatography analysis apparatus in positive and negative modes. The phospholipid elution window (phospholipid elution profile shown in FIG. 6) in negative mode is indicated by the grey area. All the ions are measured by M+H in positive mode and M−H in negative mode, apart from hexose which was measured as a sodium adduct. For visualisation purposes, the phospholipids and fatty acids were extracted by using the one 13C m/z value.

Figure 6:
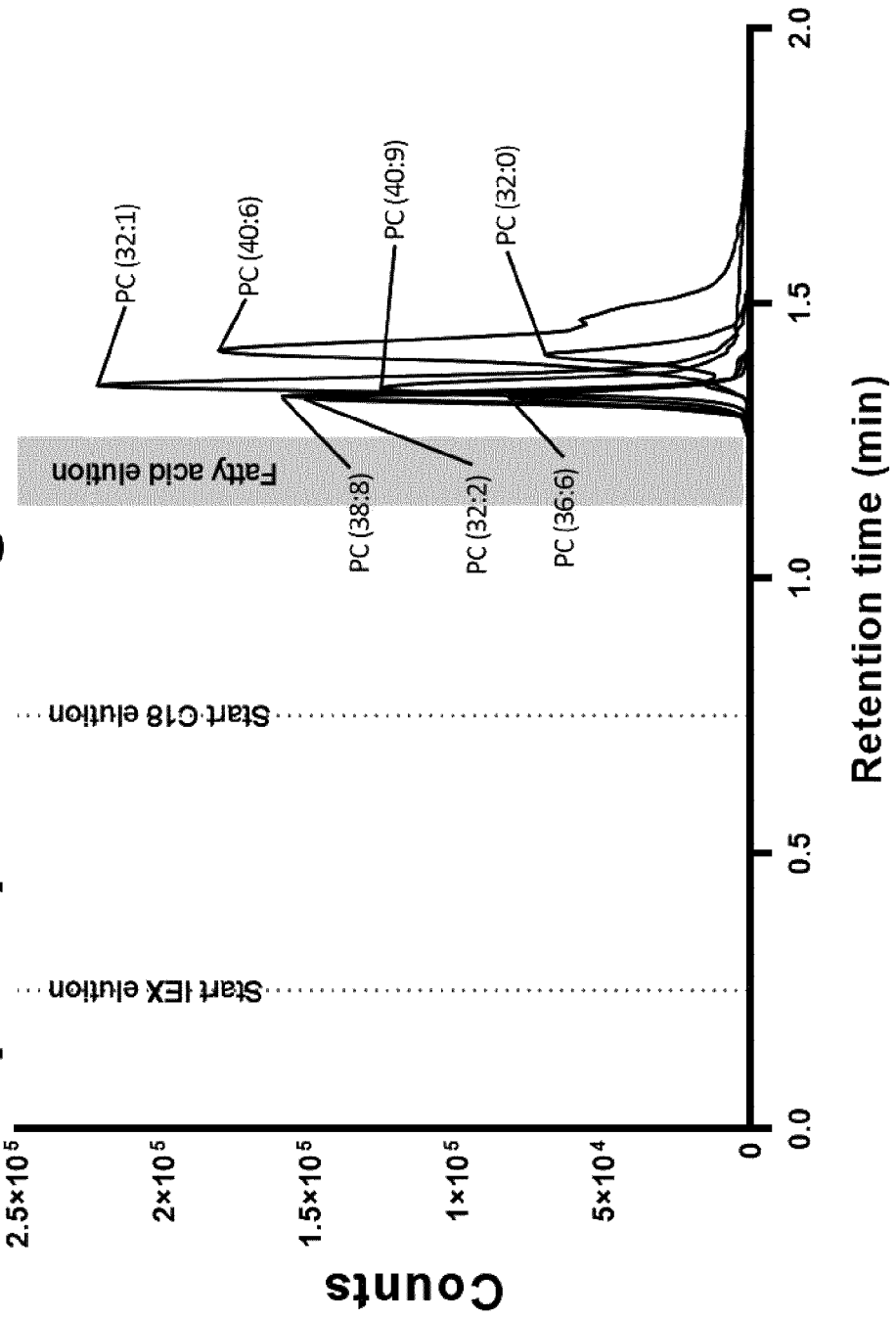

The chromatogram contains three different fractions in positive mode (flow-through: polar neutral/positive; IEX: polar positive and C18: apolar) and three fractions in negative mode (flow-through: polar neutral/negative; IEX: polar negative and C18: apolar). An overview of the fractions and charge of the analytes during loading is supplied in the Supplementary information (Table S7). The elution profile of the phospholipids in the negative fractionation method is measured in positive MS polarity (because of ionisation efficiency) and is shown in FIG. 6, which shows an extracted ion chromatogram of phospholipids in a pooled plasma sample measured by the negative fractionation method and positive MS polarity. The elution window of the fatty acids is indicated by the grey area. The phospholipids are separated from both the acylcarnitines and the fatty acids and therefore could not suppress their ionisation. This stresses the importance of the combined on-line fractionation and separation. If these fractions were collected off-line and subsequently injected into the MS, the phospholipids would have been ionised simultaneously with the fatty acids and acylcarnitines. The salts were most likely divided over the ion-exchange guard columns (SCX and WAX in positive mode and WAX in negative mode) and eluted during the ion-exchange elution. By allocating these known ion suppressors over different fractions, the ion suppression was minimised in a limited amount of time.

In general, the flow-through fraction contained analytes that did not interact with the stationary phase or were only slightly retained. Their nature was polar and during loading, they had a zero or one net charge. The net charge was either constant or in equilibrium with the neutral state. The second fraction comprised all the components that were trapped on the IEX guard columns. A compound was efficiently trapped on the IEX guard column if it consisted of multiple net charges or was in equilibrium between one net charge and multiple charges at the pH during loading. The third fraction consisted of all the apolar compounds, which were efficiently trapped on and eluted from the C18 guard column.

Creatinine was strongly retained but not trapped on the SCX guard column. Creatinine had one positive net charge and two additional neutral nitrogen atoms, which could have potentially increased the interaction with the stationary phase. Non-gaussian shaped peaks were integrated by integrating the area under the curve between the two intersections with the baseline. These compounds were corrected by their corresponding internal standard because their peak shape and retention time were similar. Other analytes were corrected either by their corresponding internal standard or by an internal standard that coeluted.

Method Validation

The validation was performed by assessing the repeatability, intermediate precision, carryover, LOD, LLOQ and the matrix effect of the method. The results of the validation can be found in Supplementary information (Table S8).

The mean repeatability and intermediate precision were 6.0 and 7.1% respectively. The relative standard deviation of 48 compounds was below 15% and two components varied more than 15%: TMAO and guanine. This was most likely caused by the low signal of these analytes due to the low physiological concentration and the low molecular weight. A sufficient repeatability was maintained after more than a thousand injections using the same set of guard columns. The coefficient of determination ($R^2$) was on average 0.995, which indicated a good linearity of the fractionation method. The linearity of 47 compounds was higher than 0.99 and three compounds revealed a linearity lower than 0.99. The linearity of C16-carnitine and C18-carnitine was compromised by matrix interferences since a calibration curve constructed in water demonstrated a sufficient linearity (>0.99). All the acylcarnitines were corrected by the same internal standard, i.e. octanoylcarnitine-d3. This internal standard corrected well for co-eluting analytes C8- and C10-carnitine. C16- and C18-carnitine were more strongly retained and eluted further away from the internal standard and closer to the (phospho)lipids. Therefore, the linearity of these analytes would be improved by the correction of a more apolar internal standard. The lower linearity of docosapentaenoic acid was found for both plasma and water samples.

Figure 7:
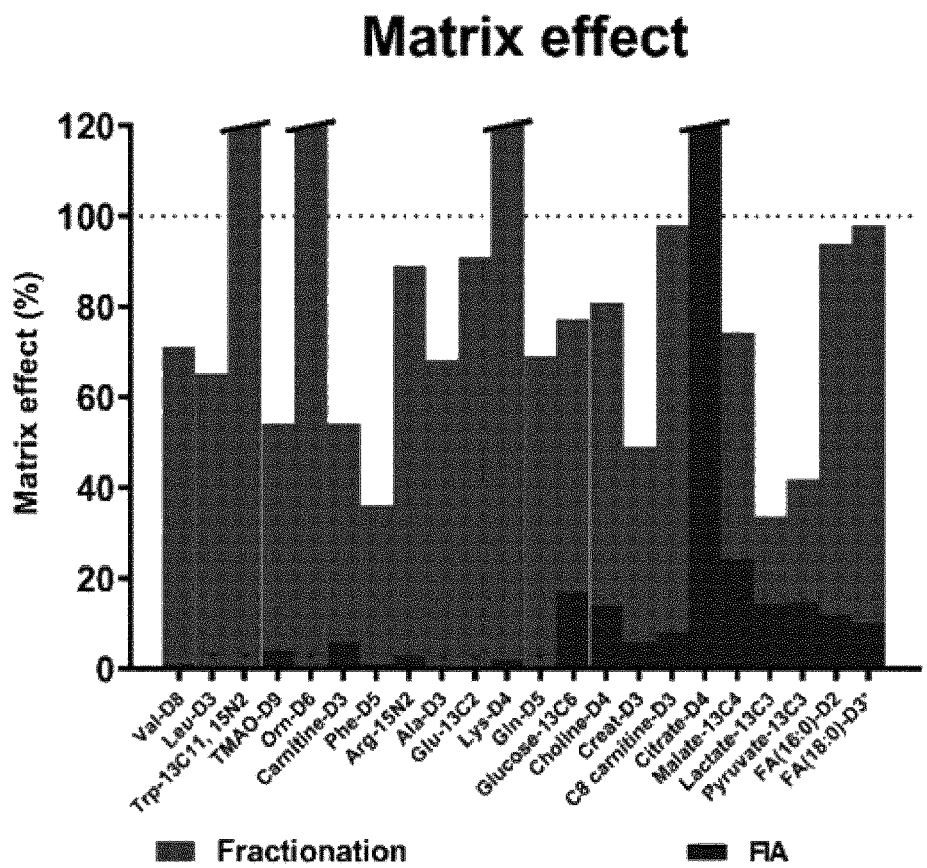

The LOD and LLOQ were determined by spiking several internal standards in plasma. This was done because the analytes of interest were endogenous and differences in chromatography were observed between water and plasma samples. FIG. 7 demonstrates that physiological blood levels as reported in literature were higher than the calculated LLOQ indicating a sufficient sensitivity of the method. The average carryover was 0.5% when a blank sample was measured after a QC sample. In total 48 compounds demonstrated a lower carryover than 2%. There were two compounds with a higher carryover: methionine (5.3%) and decanoylcarnitine (2.4%). The carryover of methionine can be explained by the fact that sulphur sticks to stainless steel. Although a slight carryover has been observed, the analytes of interest are endogenous compounds present in every studied person, which ensured that a small carryover had a limited effect on the quantification values of the analytes.

Fractionation Versus Flow Injection Analysis and Conventional Liquid Chromatography FIG. 7 compares the performances of the fractionation method of the invention, FIA and conventional LC. The graph shows the matrix effect for each internal standard measured by either the fractionation method or FIA. Compounds with 0% matrix effect (indicated by "*") were not detected at C4 levels. Compounds that experienced ion enhancement (matrix effect>100%) were cut off at a matrix effect of 120%. Citrate-D4 was enhanced in the fractionation method as well as the FIA method. The table below the graph shows the lower limit of quantification (LLOQ) of FIA, fractionation and LC (literature values) as well as the physiological plasma levels (HMDB values). "" indicates the lack of detection at C7 levels, and "*" indicates LOD values.

In order to demonstrate the clean-up efficiency of the fractionation method, spiked internal standards in plasma and water were measured. The matrix effect, ion suppression and LLOQ were determined for the fractionation and an FIA method. FIG. 7 shows that the mean ion suppression of the fractionation method was 25%, whereas the mean ion suppression in the FIA method was 89%. The fractionation method provides a fast solution to minimise ion suppression caused by these matrix interferences. The use of three orthogonal guard columns allocated phospholipids, negative and positive salts into three different fractions. The on-line elution into the mass spectrometer and the use of high performance SPE guard columns allowed for the separation between analytes and matrix interferences within a fraction. An additional LLE step prior to the FIA decreased the ion suppression to 80%. This decrease was predominantly caused by compounds in the apolar fraction, i.e. fatty acids and acylcarnitines, as the ion suppression in the polar fraction was comparable with FIA without LLE. LLE demonstrates little clean-up efficiency because samples are only fractionated based on polarity and the obtained fractions are analysed at once without further separation. Moreover, LLE is more difficult to automate because two immiscible phases have to be analysed and a protein layer has to be pierced which might introduce particles into the MS.

The fractionation method of the invention demonstrated a superior sensitivity in comparison with FIA. The mean LLOQ of the fractionation method was 21 times lower which ensured a sufficient sensitivity to measure physiological levels in plasma. In contrast, 9 out of 22 analytes could not be quantified using the FIA method due to insufficient sensitivity (LLOQ higher than physiological levels). The substantial difference in ion suppression was most likely responsible for the differences in sensitivity. The performance improvement was mainly reflected in positive mode. In negative mode, the improvement in ion suppression and sensitivity was smaller. Although the FIA method is faster (1.4 versus 3 min), the findings in FIG. 7 emphasize the benefits of on-line fractionation prior to electrospray ionisation. When LLE is performed prior to FIA, the analysis time is doubled because two fractions have to be analysed. In this case, the analysis time of FIA and fractionation are practically similar.

When comparing the LLOQ of the ISTDs with the LLOQ of conventional LC-MS analyses reported in literature, the findings demonstrated that the sensitivity of the two techniques is in a similar range (FIG. 7). This was also expected because of the limited ion suppression in the fractionation method and a comparable peak width, injection volume and flow rate with regards to general LC-MS. However, differences in LLOQ determinations (using the signal to noise and calibration curves in a matrix-free solution) and used mass spectrometers (tandem mass spectrometry) might complicate this comparison. It does indicate that the invention is at least in a comparable sensitivity range relative to LC-MS. This is also emphasized by the coverage of the fractionation method of the invention in comparison with conventional reversed-phase (RP) and hydrophilic interaction chromatography (HILIC) separations. The number of unique retention time and m/z features was 2342, 3517 and 3534 for the fractionation method of the invention, conventional RP separation and conventional HILIC separation respectively. The difference in coverage is mostly explained by the additional isomeric separation that is experienced in conventional chromatography as the number of unique m/z features was practically similar (2113, 2478 and 2326 for fractionation, RP and HILIC, respectively).

The invention enables the analysis of multiple compound classes in 3 minutes per polarity, whereas conventional LC-MS usually requires a gradient time of 3-22 minutes per compound class. The analysis time of LC-MS can be reduced by the use of faster gradients. However, fast gradients combined with conventional chromatography demonstrate little clean-up efficiency, as it allows for roughly two fractions (retained and not retained). By using a fractionation approach according to the invention, analytes can interact with three different sorbent chemistries, which allows for an efficient separation while using fast gradients. Moreover, in the invention, the flow-through fraction is cleaned by three sorbent chemistries instead of one sorbent chemistry in conventional single analytical column methods. The benefit of short chromatographic guard columns (typically 0.5-1 cm) in comparison with conventional LC analytical columns (typically 10-15 cm) is shown by the reduced time that is needed for guard column flushing and equilibration, which drastically decreases the overall analysis time.

Effect of Circadian Rhythm and Food Intake on Metabolite Classes

There are trends in metabolite levels due to the circadian rhythm and food intake. These fluctuations are important to take into account when metabolites are studied or used as biomarkers. Different sampling times throughout the day could cause variations in metabolite levels that are not attributable to a studied disease or intervention. For this, ten healthy volunteers on ten different time points on a time scale of 24 hours were profiled.

After the data acquisition, 47 compounds were included in the data analysis and three compounds were excluded. Fatty acid 16:0 and 18:0 had an RSD of more than 15% due to fluctuating background levels. C18 carnitine also had an RSD of more than 15%.

Figure 8:
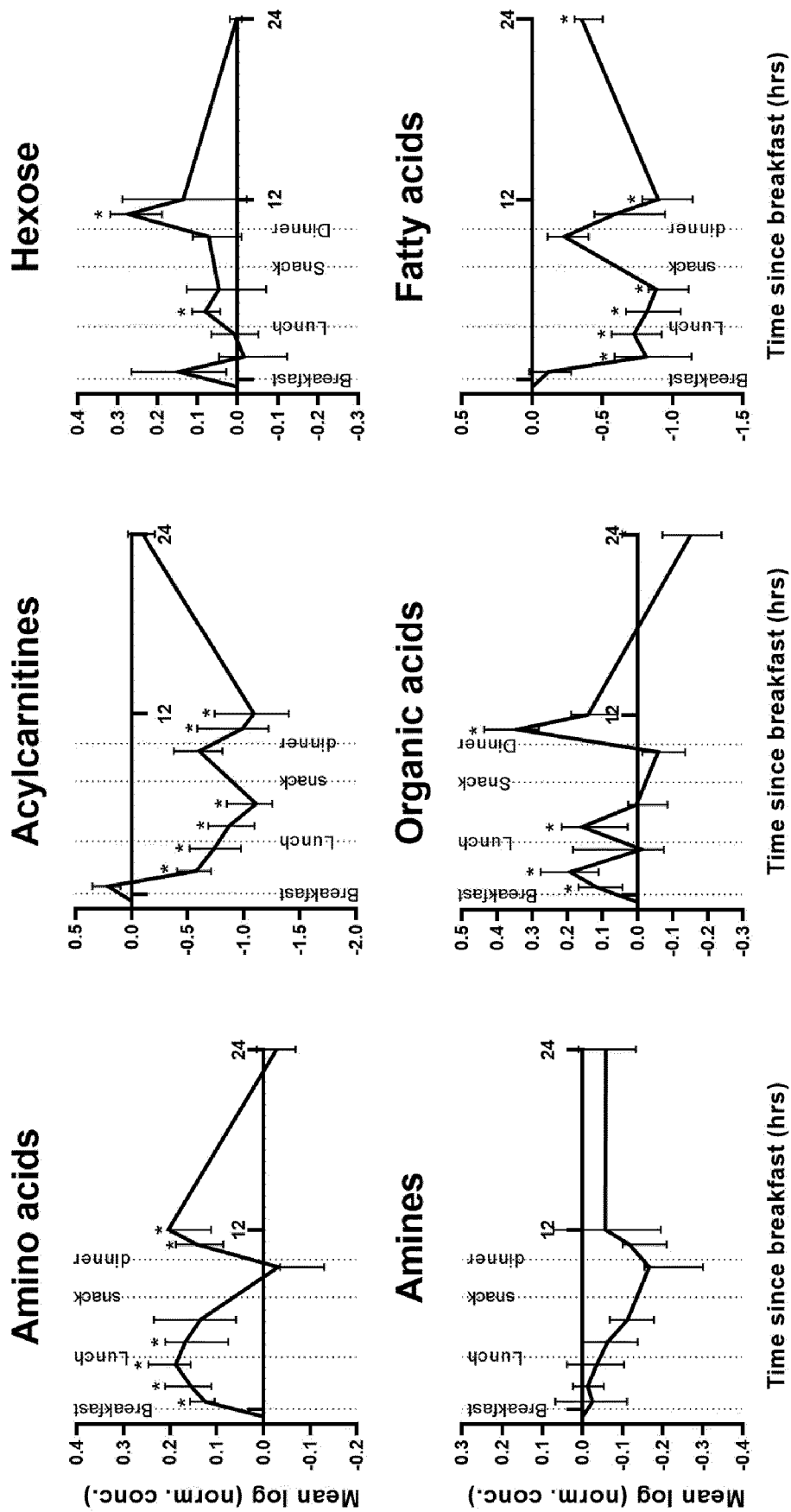

FIG. 8 shows a mean natural logarithm of normalised metabolite concentrations over time. Within each compound class, metabolites were averaged per time point and volunteer. The mean of these curves over the 10 volunteers are depicted and the pointwise interquartile range (IQR) of the volunteers is presented in the error bars. Time points that are significantly different from the baseline are indicated (*FDR adjusted p-values<0.1). The time frame comprises four standardized feeding times and meals and one night rest. The time is presented with respect to the breakfast time. FIG. 8 shows that the invention allowed the demonstration of significant changes of metabolite classes throughout the day (false discovery rate (FDR) adjusted p-values are listed in the Supplementary information Table S9). All compound classes changed significantly from the baseline, apart from the amines. The amines (quaternary amines, creatinine, urea and uric acid) did not reveal a significant difference over a period of 24 hours. The amino acid levels started to rise after wake time. The levels remained high throughout the morning/afternoon and decreased again towards baseline levels just before dinner. After dinner, the amino acids increased again and subsequently returned to baseline levels during night rest.

The hexose and organic acid levels significantly increased after the feeding times (except for hexose after breakfast which did not reach FDR corrected significance). When sugar is available, glucose is the main source of the citric acid cycle. This explains the similarities of the hexose and organic acid trends since organic acids are the main constituents in the citric acid cycle. The fatty acids concentrations decreased throughout the day and increased just before dinner and after 24 h, which has been observed before. During (overnight) fasting, glucose is mainly depleted, switching the main energy source to fatty acids. In this state, fatty acids are released from triglycerides by lipolysis, which explains the high fatty acid levels prior to dinner and after a night rest. In order to accommodate the increased demand for fatty acids, acylcarnitines are put in place to transport the fatty acids into the mitochondria for β-oxidation. This explains the similarities between the fatty acid and acylcarnitine profile. Sampling time is an indispensable parameter to take into account when metabolites are used or studied as biomarkers. Food intake and circadian rhythm significantly change compound classes from baseline levels.

Conclusions

Although much progress has been made in the analysis of metabolites, fast and global profiling of the metabolome in complex matrices remains a challenging aspect. For this purpose, the invention demonstrated a fast and comprehensive fractionation method coupled on-line to mass spectrometry. The three serially coupled high performance SPE guard columns resulted in a fractionation based on polarity, charge, and removed important ion suppressors from different fractions. The on-line and orthogonal set up realised a flow-through which was cleaned by three different sorbent chemistries and a within-fraction separation of analytes and ion suppressors. The fractionation method of the invention exhibited an improvement of performance in comparison with FIA. In a limited amount of time, the fractionation method drastically lowered the ion suppression as well as the detection limits. The on-line fractionation demonstrated similar quantification limits in comparison to the conventional LC-MS analysis. This proves that on-line fractionation using the invention enables the analysis of a large range of metabolites without suffering in terms of sensitivity. The developed fractionation method was able to demonstrate fluctuations of metabolite classes in blood samples from healthy volunteers on different time points throughout the day, which could be explained by underlying metabolic processes. These significant diurnal variations are important for clinicians when metabolites are used as biomarkers. Standardized sampling times and fasting states should minimise variations caused by food intake and circadian rhythm on the disease or intervention related variations. This work provides a methodology to target multiple metabolite classes within a single analytical platform without suffering in terms of analysis time.

It will be appreciated that any numerical values recited in the foregoing embodiments and the following supporting information are intended to help illustrate the working of the invention but are not intended to be limiting on the scope of the invention.

The listing or discussion of an apparently prior-published document or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

SUPPLEMENTARY INFORMATION

Tables S1 to S9 referred to the foregoing sections are set out as follows.

TABLE S1

Calibration standards

| Name | ChEBI ID | Standard | Solvent | C7 (µM) |
|---|---|---|---|---|
| 1-methylhistidine | 70958 | 1-methylhistidine | Water | 80 |
| 3-methylhistidine | 70959 | 3-methylhistidine | Water | 40 |
| Alanine | 16977 | L-alanine | Water | 1600 |
| Arginine | 16467 | L-arginine hydrochloride | Water | 400 |
| Betaine | 17750 | Betaine hydrochloride | Water | 300 |
| Carnitine | 16347 | L-carnitine hydrochloride | Water | 200 |
| Citrulline | 16349 | Citrulline | Water | 100 |
| Cystine | 16283 | L-cystine | 1M Hydrochloric acid | 100 |
| Glutamic acid | 16015 | L-glutamic acid | Water | 400 |
| Glutamine | 18050 | L-glutamine | Water | 2000 |
| Histidine | 15971 | L-histidine monohydrochloride monohydrate | Water | 600 |
| Isoleucine | 17191 | L-Isoleucine | Water | 200 |
| Leucine | 15603 | L-Leucine | Water | 200 |
| Lysine | 18019 | L-lysine monohydrochloride | Water | 800 |
| Methionine | 16643 | L-methionine | Water | 200 |
| Ornithine | 15729 | L-ornithine hydrochloride | Water | 400 |
| Phenylalanine | 17295 | L-phenylalanine | Water | 300 |
| Proline | 17203 | L-proline | Water | 800 |
| Serine | 17115 | L-serine | Water | 600 |
| Taurine | 15891 | Taurine | Water | 400 |
| Threonine | 16857 | L-threonine | Water | 600 |
| Tryptophan | 16828 | L-tryptophan | 0.5M hydrochloric acid | 200 |
| Tyrosine | 17895 | L-tyrosine | 1M hydrochloric acid | 200 |
| Valine | 16414 | L-valine | Water | 800 |
| TMAO | 15724 | Trimethylamine-N-oxide dihydrate | Water | 100 |
| Choline | 15354 | Choline chloride | Water | 100 |
| Creatinine | 16737 | Creatinine | Water | 400 |
| Urea | 16199 | Urea | Water | 10000 |

TABLE S1-continued

Calibration standards

| Name | ChEBI ID | Standard | Solvent | C7 (μM) |
|---|---|---|---|---|
| Glucose | 17634 | D-(+)-glucose | Water | 10000 |
| Guanine | 16235 | Guanine | 0.1M sodium hydroxide | 8 |
| Hypoxanthine | 17368 | Hypoxanthine | 1M sodium hydroxide | 200 |
| Uric acid | 17775 | Uric acid | 1M sodium hydroxide | 2000 |
| Octanoylcarnitine | 18102 | Octanoyl-L-carnitine HCl | Methanol | 1 |
| Decanoylcarnitine | 68830 | Decanoyl-L-carnitine HCl | Methanol | 1 |
| Palmitoylcarnitine | 17490 | Hexadecanoyl-L-carnitine HCl | Methanol | 0.4 |
| Stearoylcarnitine | 84644 | Octadecanoyl-L-carnitine HCl | Methanol | 0.2 |
| Aspartic acid | 22660 | DL-aspartic acid | 1M sodium hydroxide | 160 |
| Citric acid | 30769 | Citric acid | Water | 800 |
| Lactic acid | 422 | lactic acid lithium salt | Water | 3000 |
| Isocitric acid | 30887 | Isocitric acid | Water | 40 |
| Pyruvic acid | 32816 | sodium pyruvate | Water | 400 |
| Aconitic acid | 32805 | Cis-aconitic acid | Water | 225 |
| Alpha-ketoglutaric acid | 30915 | Alpha-ketoglutaric acid disodium salt hydrate | Water | 80 |
| 2-Hydroxybutyric acid | 1148 | 2-Hydroxybutyric acid sodium salt (97%) | Water | 400 |
| 3-Hydroxybutyric acid | 20067 | 3-hydroxybutyric acid | Water | 800 |
| Malic acid | 6650 | DL-Malic acid | Water | 120 |
| Indoxyl sulfate | 43355 | Indoxyl sulfate potassium salt | Methanol | 20 |
| Alpha-linolenic acid | 27432 | Alpha-linolenic acid | Ethanol | 10 |
| Docosahexaenoic acid | 28125 | Docosahexaenoic acid | Ethanol | 4 |
| Docosapentaenoic acid | 65136 | Docosapentaenoic acid | Ethanol | 2 |
| Linoleic acid | 17351 | Linoleic acid | Methanol | 200 |
| Arachidonic acid | 15843 | Arachidonic acid | Ethanol | 30 |
| Palmitic acid | 15756 | Palmitic acid | Methanol | 200 |
| Oleic acid | 16196 | Oleic acid | Ethanol | 200 |
| Stearic acid | 28842 | Stearic acid | Isopropanol | 100 |

TABLE S2

Internal standards

| Name | Standard | Solvent | C6 (μM) |
|---|---|---|---|
| Phenyl alanine | DL-Phenyl-d5-alanine | Water | 320 |
| Trimethylamine-N-oxide | Trimethylamine N-oxide-D9 | Water | 160 |
| Alanine | DL-ALANINE-2,2,3,3-d3, 99.8% D | Water | 1600 |
| Choline | Choline-D4 Chloride | Water | 60 |
| Carnitine | L-carnitine-d3 HCl (methyl-d3) | Water | 180 |
| Creatinine | Creatinine-D3 | Water | 360 |
| Valine | L-VALINE (D8) | Water | 800 |
| Leucine | DL-Leucine-D3 | 1M hydrochloric acid | 240 |
| Ornithine | L-Ornithine-D6 hydrochloride | Water | 280 |
| Hypoxanthine | Hypoxanthine-D2 | 1M sodium hydroxide | 140 |
| Glutamine | L-GLUTAMINE (2,3,3,4,4-D5) | Water | 2000 |
| Lysine | L-LYSINE 2 HCL (4,4,5,5-D4) | Water | 720 |
| Glutamic acid | L-GLUTAMIC ACID (1,2-13C2) | 1M sodium hydroxide | 400 |
| Arginine | L-Arginine-15N2 hydrochloride | Water | 400 |
| Tryptophan | L-TRYPTOPHAN (U-13C11, U15N2) | Water | 200 |
| Glucose | Glucose-13C6 | 90% methanol | 20000 |
| Octanoylcarnitine | Octanoyl carnitine-D3 HCl | Methanol | 0.8 |
| Pyruvic acid | Pyruvic acid-13C3 | Water | 140 |
| Lactic acid | Lactic acid-13C3 | Water | 4000 |
| Malic acid | Malic acid-13C4 | Water | 24 |
| Citric acid | Citric acid-D4 | Water | 480 |
| Palmitic acid | Palmitic acid-D2 | Ethanol | 480 |
| Stearic acid | Stearic acid-D3 | Ethanol | 200 |

TABLE S3

Solid-phase extraction column information

| Brand | Type | Phase | Functional group | Particle size (μm) | pH stability | Loading buffer | Elution buffer |
|---|---|---|---|---|---|---|---|
| Hysphere | SCX | PS-DVB | Sulfonate | 10 | 1-14 | 0.1% formic acid | 100 mM ammonium acetate pH 10 |
| Hysphere | SAX | PS-DVB | Quaternary amine | 10 | 1-14 | 5 mM ammonium acetate | 1% formic acid |

TABLE S3-continued

Solid-phase extraction column information

| Brand | Type | Phase | Functional group | Particle size (μm) | pH stability | Loading buffer | Elution buffer |
|---|---|---|---|---|---|---|---|
| Oasis | WCX | Oasis HLB | Carboxylate | 30 | 0-14 | 5 mM ammonium acetate | 1% formic acid |
| Oasis | WAX | Oasis HLB | Tertiary/secondary amine | 30 | 0-14 | 5 mM ammonium acetate | 100 mM ammonium formate pH 10 |
| Sepax | SCX | PS-DVB | Sulfonate | 3 | 2-12 | 0.1% formic acid | 100 mM ammonium acetate pH 10 |
| Sepax | SAX | PS-DVB | Quaternary amine | 1.7 | 2-12 | 5 mM ammonium acetate | 1% formic acid |
| Sepax | WCX | PS-DVB | Carboxylate | 1.7 | 2-12 | 5 mM ammonium acetate | 1% formic acid |
| Sepax | WAX | PS-DVB | Tertiary amine | 5 | 2-12 | 5 mM ammonium acetate | 100 mM ammonium formate pH 10 |
| Zirchrom | SCX | Zirconia dioxide | Ethylenediamine-N,N'-tetramethylphosphonic acid | 3 | 1-10 | 0.1% formic acid | 100 mM ammonium acetate pH 10 |
| Zirchrom | SAX | Zirconia dioxide | Polyethyleneimine | 3 | 1-12 | 5 mM ammonium acetate | 1% formic acid |
| Zirchrom | WCX | Zirconia dioxide | Phosphate | 3 | 1-10 | 5 mM ammonium acetate | 1% formic acid |
| Zirchrom | WAX | Zirconia dioxide | Polyethyleneimine | 3 | 3-9 | 5 mM ammonium acetate | 100 mM ammonium formate pH 9 |

TABLE S4

Fractionation and valve parameters for positive mode

| Time (min) | Flow rate (ml/min) | % A | % B | IEX mobile phase | WAX and SCX columns |
|---|---|---|---|---|---|
| 0.00 | 0.8 | 100 | 0 | Out | In |
| 0.40 | 0.8 | 100 | 0 | In | In |
| 1.00 | 0.8 | 100 | 0 | Out | In |
| 1.01 | 0.8 | 0 | 100 | Out | Out |
| 2.10 | 0.8 | 0 | 100 | Out | Out |
| 2.11 | 0.8 | 100 | 0 | Out | Out |
| 2.35 | 0.8 | 100 | 0 | Out | In |
| 3.00 | 0.8 | 100 | 0 | Out | In |

TABLE S5

Fractionation and valve parameters for negative mode

| Time (min) | Flow rate (mL/min) | % A | % B | IEX mobile phase | WAX column |
|---|---|---|---|---|---|
| 0.00 | 0.5 | 100 | 0 | Out | In |
| 0.25 | 0.5 | 100 | 0 | In | In |
| 0.30 | 0.5 | 100 | 0 | In | In |
| 0.31 | 0.8 | 100 | 0 | In | In |
| 0.75 | 0.8 | 100 | 0 | Out | Out |
| 0.76 | 0.8 | 20 | 80 | Out | Out |
| 0.95 | 0.8 | 15 | 85 | Out | Out |
| 0.96 | 0.8 | 0 | 100 | Out | Out |
| 2.00 | 0.8 | 0 | 100 | Out | Out |
| 2.01 | 0.8 | 100 | 0 | Out | Out |
| 2.25 | 0.8 | 100 | 0 | Out | In |
| 3.00 | 0.8 | 100 | 0 | Out | In |

TABLE S6

Mass spectrometry parameters

| Platform | Polarity | Gas 1 (psi) | Gas 2 (psi) | Curtain gas (psi) | Temp (° C.) | Spray voltage (V) | Declustering Potential (V) | Collision energy (eV) |
|---|---|---|---|---|---|---|---|---|
| Fractionation | Positive | 40 | 60 | 40 | 650 | 5500 | 80 | 5 |
|  | Negative | 40 | 60 | 40 | 650 | -4500 | -60 | -5 |
| Flow injection analysis (FIA) | Positive | 40 | 40 | 30 | 550 | 5500 | 80 | 5 |
|  | Negative | 40 | 40 | 30 | 550 | -4500 | -80 | -5 |

TABLE S7

Overview of the different fractions

| Compounds | pH at loading | Method | Net charge during loading | Fraction | Compound class |
|---|---|---|---|---|---|
| Valine/Betaine | 2.5 | Negative | +/neutral | Flow-through | None |
| Leucine/Isoleucine | 2.5 | Positive | +/neutral | Flow-through | Amino acids |
| Tryptophan | 2.5 | Positive | +/neutral | SCX | Amino acids |
| Trimethylamine-N-oxide | 2.5 | Positive | Neutral | Flow-through | Amines |
| Ornithine | 2.5 | Positive | +/+ + | SCX | Amino acids |
| Carnitine | 2.5 | Positive | +/neutral | Flow-through | Amines |

TABLE S7-continued

Overview of the different fractions

| Compounds | pH at loading | Method | Net charge during loading | Fraction | Compound class |
|---|---|---|---|---|---|
| 1/3-methylhistidine | 2.5 | Positive | +/+ + | SCX | Amino acids |
| Phenylalanine | 2.5 | Positive | +/neutral | Flow-through | Amino acids |
| Serine | 2.5 | Negative | +/neutral | Flow-through | Amino acids |
| Citrulline | 2.5 | Positive | +/neutral | Flow-through | Amino acids |
| Methionine | 2.5 | Positive | +/neutral | Flow-through | Amino acids |
| Arginine | 2.5 | Positive | +/+ + | SCX | Amino acids |
| Alanine | 2.5 | Positive | +/neutral | Flow-through | Amino acids |
| Cystine | 2.5 | Positive | +/+ +/neutral | SCX | Amino acids |
| Aspartic acid | 2.5 | Positive | +/neutral | Flow-through | Amino acids |
| Glutamic acid | 2.5 | Positive | +/neutral | Flow-through | Amino acids |
| Histidine | 2.5 | Positive | +/+ + | SCX | Amino acids |
| Lysine | 2.5 | Positive | +/+ + | SCX | Amino acids |
| Proline | 2.5 | Positive | +/neutral | Flow-through | Amino acids |
| Threonine | 2.5 | Negative | +/neutral | Flow-through | Amino acids |
| Urea | 2.5 | Positive | Neutral | Flow-through | Amines |
| Glutamine | 2.5 | Negative | +/neutral | Flow-through | Amino acids |
| Glucose | 2.5 | Positive | Neutral | Flow-through | Hexose |
| Tyrosine | 2.5 | Negative | +/neutral | Flow-through | Amino acids |
| Choline | 2.5 | Positive | + | Flow-through | Amines |
| Hypoxanthine | 2.5 | Positive | +/neutral | Flow-through | Purines |
| Guanine | 2.5 | Positive | +/neutral | Flow-through | Purines |
| Uric acid | 2.5 | Positive | Neutral | Flow-through | Amines |
| Creatinine | 2.5 | Positive | + | Flow-through/SCX | Amines |
| Taurine | 2.5 | Positive | Neutral | Flow-through | Amino acids |
| Palmitoylcarnitine | 2.5 | Positive | +/neutral | C18 | Acylcarnitines |
| Stearoylcarnitine | 2.5 | Positive | +/neutral | C18 | Acylcarnitines |
| Decanoylcarnitine | 2.5 | Positive | +/neutral | C18 | Acylcarnitines |
| Octanoylcarnitine | 2.5 | Positive | +/neutral | C18 | Acylcarnitines |
| (Iso)Citric acid | 7 | Negative | −3 | WAX | Organic acids |
| Malic acid | 7 | Negative | −2 | WAX | Organic acids |
| Lactic acid | 7 | Negative | − | Flow-through | Organic acids |
| Pyruvic acid | 7 | Negative | − | Flow-through | Organic acids |
| Aconitic acid | 7 | Negative | −3 | WAX | Organic acids |
| Alpha-ketoglutaric acid | 7 | Negative | −2 | WAX | Organic acids |
| 2/3-Hydroxybutyric acid | 7 | Negative | − | Flow-through | Organic acids |
| Indoxylsulfate | 7 | Negative | −(sulfate) | WAX | Organic acids |
| Palmitic acid | 7 | Negative | − | C18 | Fatty acids |
| Stearic acid | 7 | Negative | − | C18 | Fatty acids |
| Alpha-linolenic acid | 7 | Negative | − | C18 | Fatty acids |
| Docosahexaenoic acid | 7 | Negative | − | C18 | Fatty acids |
| Docosapentaenoic acid | 7 | Negative | − | C18 | Fatty acids |
| Linoleic acid | 7 | Negative | − | C18 | Fatty acids |
| Arachidonic acid | 7 | Negative | − | C18 | Fatty acids |
| Oleic acid | 7 | Negative | − | C18 | Fatty acids |

TABLE S8

Method validation parameters (CO = carryover and ME = matrix effect)

| Name | ISTD | Repeatability | | | Intermediate precision | | | CO ($1^{st}$) | CO ($2^{nd}$) | $R^2$ | ME (%) | LOD (µM) | LLOQ (µM) |
|---|---|---|---|---|---|---|---|---|---|---|---|---|---|
| | | C0 RSD (%) | C2 RSD (%) | C4 RSD (%) | C0 RSD (%) | C2 RSD (%) | C4 RSD (%) | | | | | | |
| Valine/Betaine | Val | 1.6 | 2.0 | 1.4 | 3.4 | 2.8 | 2.3 | 0.0 | 0.0 | 0.992 | 71 | 0.4 | 1 |
| Leucine/Isoleucine | Leu | 2.9 | 1.1 | 1.7 | 2.5 | 3.1 | 2.9 | 0.0 | 0.0 | 0.993 | 65 | 0.5 | 1 |
| Tryptophan | Tryp | 5.8 | 0.9 | 2.0 | 4.7 | 1.8 | 2.4 | 0.0 | 0.0 | 0.997 | 336 | 0.3 | 1 |
| Trimethylamine-N-oxide | TMAO | 18.1 | 3.6 | 1.0 | 14.8 | 7.5 | 3.1 | 0.0 | 0.0 | 0.999 | 54 | 0.4 | 1 |
| Ornithine | Lys | 13.9 | 3.4 | 1.4 | 11.1 | 6.5 | 3.8 | 0.0 | 0.0 | 0.994 | 137 | 3 | 10 |
| Carnitine | Car | 3.8 | 0.1 | 2.0 | 3.0 | 1.4 | 1.7 | 0.0 | 0.0 | 1.000 | 54 | 0.01 | 0.03 |
| 1/3-methylhistidine | Arg | 10.5 | 0.8 | 1.4 | 8.8 | 1.7 | 2.0 | 0.0 | 0.0 | 0.996 | | | |
| Phenylalanine | Phe | 6.6 | 1.6 | 3.6 | 7.2 | 5.9 | 4.9 | 0.0 | 0.0 | 0.993 | 36 | 1 | 4 |
| Serine | Val | 6.3 | 2.4 | 1.9 | 4.9 | 4.6 | 4.2 | 0.0 | 0.0 | 0.994 | | | |
| Citrulline | Val | 3.9 | 2.1 | 2.6 | 6.0 | 4.7 | 5.8 | 0.0 | 0.0 | 0.997 | | | |
| Methionine | Val | 5.4 | 1.8 | 1.6 | 5.1 | 3.8 | 3.5 | 5.3 | 1.5 | 0.999 | | | |
| Arginine | Arg | 3.3 | 1.2 | 0.8 | 3.6 | 1.8 | 2.3 | 2.0 | 0.0 | 0.999 | 89 | 0.2 | 0.5 |
| Alanine | Glu | 4.7 | 1.4 | 3.8 | 5.2 | 2.3 | 3.8 | 0.0 | 0.0 | 0.997 | 68 | 8 | 27 |
| Cystine | Lys | 6.0 | 2.2 | 3.7 | 7.9 | 3.3 | 5.0 | 0.0 | 0.0 | 0.991 | | | |
| Aspartic acid | Val | 4.8 | 3.7 | 4.3 | 5.9 | 6.3 | 4.2 | 0.0 | 0.0 | 0.995 | | | |

TABLE S8-continued

Method validation parameters (CO = carryover and ME = matrix effect)

| Name | ISTD | Repeatability C0 RSD (%) | Repeatability C2 RSD (%) | Repeatability C4 RSD (%) | Intermediate precision C0 RSD (%) | Intermediate precision C2 RSD (%) | Intermediate precision C4 RSD (%) | CO (1st) | CO (2nd) | $R^2$ | ME (%) | LOD (µM) | LLOQ (µM) |
|---|---|---|---|---|---|---|---|---|---|---|---|---|---|
| Glutamic acid | Leu | 3.2 | 0.7 | 1.4 | 3.2 | 3.5 | 2.4 | 0.0 | 0.0 | 0.996 | 91 | 1 | 1 |
| Histidine | Arg | 12.1 | 1.6 | 0.9 | 10.0 | 4.6 | 2.9 | 0.5 | 0.1 | 0.995 | | | |
| Lysine | Lys | 4.3 | 2.7 | 3.3 | 3.6 | 3.0 | 3.1 | 0.0 | 0.0 | 0.995 | 130 | 1 | 4 |
| Proline | Val | 2.3 | 1.9 | 2.4 | 1.8 | 2.1 | 1.6 | 0.0 | 0.0 | 0.998 | | | |
| Threonine | glu | 5.7 | 1.8 | 3.2 | 4.2 | 4.7 | 2.4 | 0.0 | 0.0 | 0.995 | | | |
| Urea | Phe | 4.2 | 3.9 | 3.4 | 4.7 | 3.1 | 2.4 | 0.0 | 0.0 | 0.993 | | | |
| Glutamine | glu | 3.6 | 0.7 | 2.0 | 2.7 | 1.9 | 1.8 | 0.0 | 0.0 | 0.999 | 69 | 1 | 4 |
| Glucose | Glucose | 7.2 | 1.2 | 7.9 | 5.3 | 2.7 | 5.1 | 0.0 | 0.0 | 0.998 | 77 | 3 | 10 |
| Tyrosine | Glu | 2.2 | 6.4 | 3.7 | 4.4 | 7.6 | 4.1 | 0.0 | 0.0 | 0.999 | | | |
| Choline | Choline | 3.4 | 1.4 | 1.2 | 2.7 | 1.5 | 1.6 | 0.0 | 0.0 | 0.999 | 81 | 0.04 | 0.1 |
| Hypoxanthine | Phe | 6.6 | 4.2 | 1.2 | 12.1 | 4.9 | 2.7 | 0.0 | 0.0 | 0.998 | | | |
| Guanine | Leu | 18.9 | 8.2 | 6.5 | 15.4 | 8.8 | 6.7 | 0.0 | 0.0 | 0.991 | | | |
| Uric acid | Glu | 1.6 | 2.2 | 1.3 | 2.3 | 3.7 | 4.3 | 0.0 | 0.0 | 0.991 | | | |
| Creatinine | Creat | 4.2 | 0.4 | 1.5 | 3.4 | 1.3 | 1.3 | 0.0 | 0.0 | 0.999 | 49 | 0.09 | 0.3 |
| Taurine | Glu | 3.2 | 2.1 | 2.6 | 3.7 | 4.4 | 4.4 | 0.0 | 0.0 | 0.997 | | | |
| C16 carnitine | C8 carnitine | 3.8 | 4.0 | 1.4 | 5.5 | 9.0 | 10.0 | 1.8 | 0.0 | 0.982 | | | |
| C18 carnitine | C8 carnitine | 11.6 | 6.0 | 3.3 | 11.2 | 11.7 | 6.9 | 0.0 | 0.0 | 0.987 | | | |
| C10 carnitine | C8 carnitine | 4.1 | 1.4 | 5.4 | 9.1 | 6.0 | 8.6 | 2.4 | 1.3 | 0.990 | | | |
| C8 carnitine | C8 carnitine | 4.6 | 3.1 | 5.0 | 5.8 | 3.8 | 4.1 | 0.0 | 0.0 | 0.994 | 98 | 0.002 | 0.003 |
| Citrate | Citrate | 1.5 | 1.3 | 3.5 | 2.0 | 1.8 | 3.3 | 0.3 | 0.2 | 0.999 | 562 | 0.7 | 1 |
| Malate | Malate | 10.6 | 3.2 | 0.6 | 14.7 | 5.1 | 3.9 | 0.4 | 0.0 | 0.993 | 75 | 0.4 | 0.9 |
| Lactate | Lactate | 1.5 | 0.7 | 4.1 | 1.9 | 3.0 | 2.7 | 0.0 | 0.0 | 0.991 | 34 | 5 | 13 |
| Pyruvate | Lactate | 4.0 | 4.8 | 2.9 | 4.9 | 4.9 | 5.0 | 0.0 | 0.0 | 0.993 | 41 | 9 | 19 |
| Aconate | Citrate | 5.8 | 1.9 | 3.2 | 8.5 | 4.7 | 3.6 | 0.9 | 0.0 | 0.998 | | | |
| α-keto-glutarate | Citrate | 8.5 | 7.3 | 4.1 | 11.4 | 6.8 | 6.6 | 2.0 | 0.1 | 0.996 | | | |
| 2/3-hydroxy-butyrate | Lactate | 8.3 | 0.6 | 0.7 | 7.0 | 4.0 | 3.2 | 0.0 | 0.0 | 0.999 | | | |
| Indoxyl-sulfate | Citrate | 3.1 | 3.7 | 7.3 | 9.6 | 6.7 | 8.0 | 0.0 | 0.0 | 0.995 | | | |
| FA(16:0) | FA(16:0) | 8.9 | 10.1 | 10.9 | 13.5 | 8.6 | 11.0 | 0.8 | 0.0 | 0.996 | 94 | 0.6 | 0.7 |
| FA(18:0) | FA(18:0) | 9.2 | 6.6 | 5.0 | 14.4 | 8.4 | 9.7 | 0.0 | 0.0 | 0.996 | 98 | 0.2 | 0.6 |
| FA(18:3) | FA(16:0) | 3.6 | 3.7 | 0.9 | 13.6 | 14.3 | 6.9 | 1.9 | 0.8 | 0.996 | | | |
| FA(22:6) | FA(16:0) | 7.6 | 2.3 | 0.3 | 6.9 | 4.5 | 6.2 | 0.4 | 0.0 | 0.998 | | | |
| FA(22:5) | FA(18:0) | 6.3 | 12.6 | 2.5 | 7.9 | 10.7 | 6.8 | 1.6 | 0.3 | 0.974 | | | |
| FA(18:2) | FA(18:0) | 5.0 | 3.3 | 2.2 | 11.6 | 5.6 | 2.7 | 1.2 | 0.0 | 0.998 | | | |
| FA(20:4) | FA(18:0) | 4.9 | 3.0 | 1.9 | 7.9 | 3.8 | 4.5 | 2.0 | 0.6 | 0.998 | | | |
| FA(18:1) | FA(18:0) | 3.7 | 6.0 | 2.1 | 4.7 | 6.4 | 5.2 | 0.9 | 0.1 | 0.996 | 562 | | |

TABLE S9

P-values and FDR adjusted p-values of several compound classes on different time points in comparison to baseline levels

| Compound class | Time after breakfast (hours) | P-value | FDR adjusted p-value |
|---|---|---|---|
| Amino acids | 0.5 | 0.006 | 0.063 |
| | 1.5 | 0.004 | 0.046 |
| | 3 | 0.002 | 0.032 |
| | 4.5 | 0.002 | 0.032 |
| | 6 | 0.037 | 0.296 |
| | 9.5 | 0.16 | 0.942 |
| | 11 | 0.002 | 0.032 |
| | 12 | 0.002 | 0.032 |
| | 24 | 0.131 | 0.829 |
| Amines | 0.5 | 0.846 | 1 |
| | 1.5 | 0.557 | 1 |
| | 3 | 0.232 | 1 |
| | 4.5 | 0.105 | 0.686 |
| | 6 | 0.064 | 0.498 |
| | 9.5 | 0.084 | 0.576 |
| | 11 | 0.084 | 0.576 |
| | 12 | 0.557 | 1 |
| | 24 | 0.16 | 0.942 |
| Acylcarnitines | 0.5 | 0.014 | 0.13 |
| | 1.5 | 0.002 | 0.032 |
| | 3 | 0.002 | 0.032 |
| | 4.5 | 0.002 | 0.032 |
| | 6 | 0.002 | 0.032 |
| | 9.5 | 0.006 | 0.063 |
| | 11 | 0.002 | 0.032 |
| | 12 | 0.002 | 0.032 |
| | 24 | 0.232 | 1 |
| Hexose | 0.5 | 0.02 | 0.166 |
| | 1.5 | 0.77 | 1 |
| | 3 | 0.922 | 1 |
| | 4.5 | 0.002 | 0.032 |
| | 6 | 0.557 | 1 |
| | 9.5 | 0.16 | 0.942 |
| | 11 | 0.002 | 0.032 |
| | 12 | 0.084 | 0.576 |
| | 24 | 1 | 1 |

TABLE S9-continued

P-values and FDR adjusted p-values of several compound classes on different time points in comparison to baseline levels

| Compound class | Time after breakfast (hours) | P-value | FDR adjusted p-value |
|---|---|---|---|
| Organic acids | 0.5 | 0.002 | 0.034 |
| | 1.5 | 0.004 | 0.046 |
| | 3 | 0.846 | 1 |
| | 4.5 | 0.006 | 0.058 |
| | 6 | 0.846 | 1 |
| | 9.5 | 0.105 | 0.686 |
| | 11 | 0.002 | 0.034 |
| | 12 | 0.02 | 0.166 |
| | 24 | 0.006 | 0.058 |
| Fatty acids | 0.5 | 0.193 | 1 |
| | 1.5 | 0.004 | 0.046 |
| | 3 | 0.004 | 0.046 |
| | 4.5 | 0.004 | 0.046 |
| | 6 | 0.004 | 0.046 |
| | 9.5 | 0.105 | 0.686 |
| | 11 | 0.037 | 0.296 |
| | 12 | 0.004 | 0.046 |
| | 24 | 0.01 | 0.097 |

The invention claimed is:

1. A chromatography analysis apparatus comprising:
a fractionation device for receiving a sample, the fractionation device defining a sample flow path that includes a plurality of guard columns, wherein the guard columns have different sorbent chemistries; and
a fractionation output analyser,
wherein a fractionation output of the guard columns is provided to an input of the fractionation output analyser for enabling subsequent analysis of the fractionation output by the fractionation output analyser.

2. The chromatography analysis apparatus according to claim 1 wherein the guard columns are serially connected to define a cascade arrangement of the guard columns, and a fractionation output of the cascade arrangement of the guard columns is provided to an input of the fractionation output analyser for enabling subsequent analysis of the fractionation output by the fractionation output analyser.

3. The chromatography analysis apparatus according to claim 2 wherein the guard columns include a reversed-phase guard column and at least one ion-exchange guard column, and wherein the cascade arrangement of the guard columns includes the reversed-phase guard column followed by the at least one ion-exchange guard column.

4. The chromatography analysis apparatus according to claim 2 wherein the guard columns include a reversed-phase guard column, an anion-exchange guard column and a cation-exchange guard column, and wherein the cascade arrangement of the guard columns includes the reversed-phase guard column followed by the anion-exchange guard column followed by the cation-exchange guard column.

5. The chromatography analysis apparatus according to claim 1 wherein the plurality of guard columns includes a first guard column coupled on-line with a second guard column so that a fractionation output of the first guard column is provided to an input of the second guard column.

6. The chromatography analysis apparatus according to claim 1 wherein the plurality of guard columns includes a first guard column coupled off-line with a second guard column so that a fractionation output of the first guard column is provided to an input of the second guard column.

7. The chromatography analysis apparatus according to claim 1 wherein the fractionation output analyser includes a mass spectrometer or a nuclear magnetic resonance spectrometer.

8. The chromatography analysis apparatus according to claim 1 wherein the guard column has a column length of less than 3 cm.

9. The chromatography analysis apparatus according to claim 8 wherein the guard column has a column length in the range from 0.5 cm to 1.0 cm.

10. The chromatography analysis apparatus according to claim 1 wherein the guard column is a solid-phase extraction column.

11. The chromatography analysis apparatus according to claim 1 wherein the guard column is selected from a group consisting of a reversed-phase guard column, an anion-exchange guard column and a cation-exchange guard column.

12. The chromatography analysis apparatus according to claim 1 wherein the guard column has a sorbent chemistry that is a combination of multiple sorbent chemistries.

13. The chromatography analysis apparatus according to claim 1 wherein the sample flow path includes a flow valve arrangement, the flow valve arrangement including a flow valve operatively coupled to the guard column so that, in use, the flow valve is operable to selectively switch the guard column into and out of the sample flow path.

14. The chromatography analysis apparatus according to claim 13 wherein the flow valve arrangement includes a plurality of flow valves, each flow valve operatively coupled to a respective one of the plurality of guard columns so that, in use, each flow valve is operable to selectively switch the corresponding guard column into and out of the sample flow path.

15. The chromatography analysis apparatus according to claim 1 wherein the guard column is coupled on-line with the fractionation output analyser so that a fractionation output of the guard column is provided to an input of the fractionation output analyser for enabling subsequent on-line analysis of the fractionation output by the fractionation output analyser.

16. The chromatography analysis apparatus according to claim 1 wherein the guard column is coupled off-line with the fractionation output analyser so that a fractionation output of the guard column is provided to an input of the fractionation output analyser for enabling subsequent off-line analysis of the fractionation output by the fractionation output analyser.

17. The chromatography analysis apparatus according to claim 1 wherein the fractionation output analyser includes an ioniser configured to, in use, ionise the fractionation output for subsequent analysis by the fractionation output analyser.

18. A method of carrying out a chromatography analysis procedure, the method comprising the steps of:
providing a sample to a fractionation device, the fractionation device defining a sample flow path that includes a plurality of guard columns, wherein the guard columns have different sorbent chemistries;
carrying out a fractionation of the sample using the guard columns; and
providing a fractionation output of the guard columns to an input of the fractionation output analyser.

* * * * *